(12) United States Patent
Chong et al.

(10) Patent No.: US 9,445,088 B2
(45) Date of Patent: Sep. 13, 2016

(54) LCU-BASED ADAPTIVE LOOP FILTERING FOR VIDEO CODING

(71) Applicant: QUALCOMM Incorporated, San Diego, CA (US)

(72) Inventors: In Suk Chong, San Diego, CA (US); Marta Karczewicz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 720 days.

(21) Appl. No.: 13/858,899

(22) Filed: Apr. 8, 2013

(65) Prior Publication Data

US 2013/0266059 A1 Oct. 10, 2013

Related U.S. Application Data

(60) Provisional application No. 61/621,931, filed on Apr. 9, 2012.

(51) Int. Cl.
| | |
|---|---|
| *H04N 19/169* | (2014.01) |
| *H04N 19/46* | (2014.01) |
| *H04N 19/117* | (2014.01) |
| *H04N 19/14* | (2014.01) |
| *H04N 19/17* | (2014.01) |
| *H04N 19/82* | (2014.01) |
| *H04N 19/147* | (2014.01) |

(52) U.S. Cl.
CPC ...... *H04N 19/00254* (2013.01); *H04N 19/117* (2014.11); *H04N 19/14* (2014.11); *H04N 19/17* (2014.11); *H04N 19/46* (2014.11); *H04N 19/82* (2014.11); *H04N 19/147* (2014.11)

(58) Field of Classification Search
CPC combination set(s) only.
See application file for complete search history.

(56) References Cited

U.S. PATENT DOCUMENTS

| | | | | |
|---|---|---|---|---|
| 2012/0039383 A1* | 2/2012 | Huang | | H04N 19/176 375/240.02 |
| 2012/0044986 A1* | 2/2012 | Chong | | H04N 19/46 375/240.02 |

(Continued)

FOREIGN PATENT DOCUMENTS

| | | |
|---|---|---|
| WO | 2011146105 A1 | 11/2011 |
| WO | 2012142966 A1 | 10/2012 |

OTHER PUBLICATIONS

Bross et al., "High efficiency video coding (HEVC) text specification draft 10 (For FDIS & Last Call)," 12th Meeting: Geneva, CH, Jan. 14-23, 2013, JCTCV-L1003_v34, 310 pp.

(Continued)

*Primary Examiner* — Christopher S Kelley
*Assistant Examiner* — Asmamaw G Tarko
(74) *Attorney, Agent, or Firm* — Shumaker & Sieffert, P.A.

(57) ABSTRACT

Video encoders and video decoders filter reconstructed video data in a video encoding and/or video decoding processes and, more particularly, may perform adaptive loop filtering. Instead of implementing region adaptive (RA) classification using a fixed set of regions, a variable number of regions in a picture can be used. Additionally or alternatively, a global set of filters can be signaled in a parameter set from an encoder to a decoder, but instead of selecting filters from the global set based on an RA classification or a block adaptive (BA) classification, a filter from the global set can be explicitly signaled, for a given block, using a filter ID associated with the filter.

54 Claims, 13 Drawing Sheets

(56) References Cited

U.S. PATENT DOCUMENTS

| | | | |
|---|---|---|---|
| 2012/0207227 A1* | 8/2012 | Tsai | H04N 19/136 375/240.29 |
| 2012/0287989 A1 | 11/2012 | Budagavi et al. | |
| 2012/0300850 A1 | 11/2012 | Yie et al. | |
| 2013/0003868 A1 | 1/2013 | Sjoberg et al. | |
| 2013/0034159 A1 | 2/2013 | Siekmann et al. | |
| 2013/0259118 A1* | 10/2013 | Fu | H04N 19/00066 375/240.02 |

OTHER PUBLICATIONS

Bross et al., "High efficiency video coding (HEVC) text specification draft 7," 9th Meeting: Geneva, CH, Apr. 27-May 7, 2012, JCTVC-I1003_d2, 290 pp.

Bross et al., "High efficiency video coding (HEVC) text specification draft 8," 10th Meeting: Stockholm, SE, Jul. 11-20, 2012, JCTVC-J1003_d7, 261 pp.

Bross et al., "High efficiency video coding (HEVC) text specification draft 6," 8th Meeting: San Jose, CA, USA, Feb. 1-10, 2012, JCTVC-H1003, 259 pp.

Bross et al., "High efficiency video coding (HEVC) text specification draft 9," 11th Meeting: Shanghai, CN, Oct. 10-19, 2012, JCTVC-K1003_v7, 290 pp.

Bross et al., "WD4: Working Draft 4 of High-Efficiency Video Coding," 6th Meeting: JCTVC-F803_d2, Torino, IT, Jul. 14-22, 2011, 226 pp.

Bross et al., "WD5: Working Draft 5 of High-Efficiency Video Coding," 7th Meeting: Geneva, Switzerland, Nov. 21-30, 2011, JCTVC-G1103_d2, 214 pp.

Chen et al., "CE8 Subtest2: A Joint Proposal on Improving the Adaptive Loop Filter in TMuC0.9 by MediaTek", 95.MPEG Meeting; Jan. 24, 2011-Jan. 28, 2011; Daegu; (Motion Picture Expert Group or ISO/IECJTC1/SC29/WG11),, No. m18871, XP030047440, 9 pp.

Esenlik, et al.,"Non-CE8: Low-delay support for APS", MPEG Meeting, Jun. 2, 2012-Oct. 2, 2012, San Josa CR, (Motion Picture Expert Group or ISO/IEC JTC1/SC29/WG11), No. m23251, XP030051776, 9 pp.

Huang, et al., "Improved Quadtree-based Adaptive Loop Filter (prop)", VCEG Meeting; MPEG Meeting; Jan. 7, 2009-Aug. 7, 2009; London, Geneva; (Video Coding Experts Group of ITU-T SG.16), No. VCEG-AL24, XP030003705, 4 pp.

International Preliminary Report on Patentability—PCT/US2013/035802 , The International Bureau of WIPO—Geneva, Switzerland, Jun. 25, 2014, 11 pp.

International Search Report and Written Opinion—PCT/US2013/035802—ISA/EPO—Aug. 2, 2013, 13 pp.

ITU-T H.264, Series H: Audiovisual and Multimedia Systems, Infrastructure of audiovisual services—Coding of moving video, Advanced video coding for generic audiovisual services, The International Telecommunication Union. Jun. 2011, 674 pp.

Wiegand et al., "WD1: Working Draft 1 of High-Efficiency Video Coding", JCTVC-C403, 3rd Meeting: Guangzhou, CN, Oct. 7-15, 2010, 137 pp.

Wiegand et al., "WD2: Working Draft 2 of High-Efficiency Video Coding," JCTVC-D503, 4th Meeting: Daegu, KR, Jan. 20-28, 2011, 153 pp.

Wiegand et al., "WD3: Working Draft 3 of High-Efficiency Video Coding," Document JCTVC-E603, 5th Meeting: Geneva, CH, Mar. 16-23, 2011, 193 pp.

ITU-T H.263, Series H: Audiovisual and Multimedia Systems, Infrastructure of audiovisual services—Coding of moving video, Advanced video coding for generic audiovisual services, The International Telecommunication Union. Jan. 2005, 226 pp.

ITU-T H.265, Series H: Audiovisual and Multimedia Systems, Infrastructure of audiovisual services—Coding of moving video, Advanced video coding for generic audiovisual services, The International Telecommunication Union. Apr. 2013, 317 pp.

Second Written Opinion from International Application No. PCT/US2013/035802, dated Mar. 4, 2014, 7 pp.

Huang et al., "Improved Quadtree-based Adaptive Loop Filter," VCEG Meeting; MPEG Meeting; London, Geneva; (Video Coding Experts Group of ITU-T SG.16), No. VCEG-AL24_r1, Jul. 1-8, 2009, 7 pp.

Itu-T H.265, Series H: Audiovisual and Multimedia Systems, Infrastructure of audiovisual services—Coding of moving video, Advanced video coding for generic audiovisual services, The International Telecommunication Union, Oct. 2014, 540 pp.

Chen et al., "CE8 Subset2: A Joint Proposal on Improving the Adaptive Loop Filter in TMuC0.9 by MediaTek, Qualcomm, and Toshiba," JCT-VC Meeting; MPEG Meeting; Daegu; (Joint Collaborative Team on Video Coding of ISO/IECJTC1/SC29/WG11 and ITU-TSG.16); URL: http://wftp3.itu.int/av-arch/Jctvc-site/,, No. JCTVC-D119, Jan. 20-28, 2011, 18 pp.

* cited by examiner

610A

| R(0,0) | R(0,1) | R(0,2) | R(0,3) |
|--------|--------|--------|--------|
| R(1,0) | R(1,1) | R(1,2) | R(1,3) |
| R(2,0) | R(2,1) | R(2,2) | R(2,3) |
| R(3,0) | R(3,1) | R(3,2) | R(3,3) |

| R(0,0) | R(0,1) | R(0,2) | R(0,3) |
|--------|--------|--------|--------|
| R(1,0) | R(1,1) | R(1,2) | R(1,3) |
| R(2,0) | R(2,1) | R(2,2) | R(2,3) |

FIG. 6B

LCU-BASED ADAPTIVE LOOP FILTERING FOR VIDEO CODING

This application claims the benefit of:

U.S. Provisional Application 61/621,931 filed 9 Apr. 2012;

the entire content of which is incorporated by reference herein.

TECHNICAL FIELD

This disclosure relates to block-based digital video coding used to compress video data and, more particularly to, techniques for the filtering of video blocks.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video compression techniques, such as those described in the standards defined by MPEG-2, MPEG-4, ITU-T H.263, ITU-T H.264/MPEG-4, Part 10, Advanced Video Coding (AVC), the High Efficiency Video Coding (HEVC) standard presently under development, and extensions of such standards. The video devices may transmit, receive, encode, decode, and/or store digital video information more efficiently by implementing such video compression techniques.

Video compression techniques perform spatial (intra-picture) prediction and/or temporal (inter-picture) prediction to reduce or remove redundancy inherent in video sequences. For block-based video coding, a video slice (i.e., a video frame or a portion of a video frame) may be partitioned into video blocks, which may also be referred to as treeblocks, coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to a reference frames.

Spatial or temporal prediction results in a predictive block for a block to be coded. Residual data represents pixel differences between the original block to be coded and the predictive block. An inter-coded block is encoded according to a motion vector that points to a block of reference samples forming the predictive block, and the residual data indicating the difference between the coded block and the predictive block. An intra-coded block is encoded according to an intra-coding mode and the residual data. For further compression, the residual data may be transformed from the pixel domain to a transform domain, resulting in residual transform coefficients, which then may be quantized. The quantized transform coefficients, initially arranged in a two-dimensional array, may be scanned in order to produce a one-dimensional vector of transform coefficients, and entropy coding may be applied to achieve even more compression.

SUMMARY

This disclosure describes techniques associated with filtering reconstructed video data in a video encoding and/or video decoding processes and, more particularly, this disclosure describes techniques related to ALF. In accordance with this disclosure, filtering is applied at an encoder, and filter information is encoded in the bitstream to enable a decoder to identify the filtering that was applied at the encoder. The video encoder may test several different filters, and based on a rate-distortion analysis, choose a filter that produces a desired tradeoff between reconstructed video quality and compression quality. The video decoder receives encoded video data that includes the filter information, decodes the video data, and applies filtering based on the filtering information. In this way, the video decoder applies the same filtering that was applied at the video encoder.

In one example, a method for decoding video data includes receiving, in a parameter set for a group of largest coding units (LCUs), information for constructing a set of filters for an adaptive loop filter (ALF) operation; receiving, in the parameter set, an indication of how to divide the group of LCUs into sub-groups of LCUs; assigning each of the sub-groups of LCUs to a filter from the set of filters; receiving an indication that indicates that a first LCU is to be filtered using the ALF operation, wherein the first LCU is in a first sub-group of LCUs; and determining a filter for the first LCU based on the indication that the first LCU is to be fileted by the ALF and based on the indication of how to divide the group of LCUs into the sub-group of LCUs, wherein the filter for the first LCU corresponds to a filter assigned to the first sub-group of LCUs; and, filtering a coded unit of the LCU using the filter for the first LCU.

In another example, a method for decoding video data includes receiving, in a parameter set for a group of largest coding units (LCUs), information for constructing a set of filters for an adaptive loop filter (ALF) operation; determining for each filter in the set of filters an associated filter index; receiving an indication that indicates that a first LCU is to be filtered using the ALF operation; and receiving a filter index identifying a filter from the set of filters that is to be used for filtering the first LCU; filtering one or more coded unit (CUs) of the LCU using the filter from the set of filters.

In another example, a method for encoding video data includes generating for inclusion, in a parameter set for a group of largest coding units (LCUs), information for constructing a set of filters for an adaptive loop filter (ALF) operation; determining how to divide the group of LCUs into sub-groups of LCUs; determining for each sub-group of LCUs, an associated filter from the set of filters; determining a filter for a first LCU, wherein the first LCU is from a first sub-group of LCUs, wherein the filter for the first LCU corresponds to a filter associated with the first sub-group of LCUs; generating, for inclusion in the parameter set, an indication of how to divide the group of LCUs into the sub-groups of LCUs; and, generating, for inclusion in an encoded bitstream, an indication that indicates that the first LCU is to be filtered using the filter associated with the first sub-group of LCUs.

In another example, a method for encoding video data includes generating for inclusion, in a parameter set for a group of largest coding units (LCUs), information for constructing a set of filters for an adaptive loop filter (ALF) operation; determining for each filter in the set of filters an associated filter index; determining for a first LCU a filter from the set of filters; generating, for inclusion in an encoded bitstream, an indication that indicates that a first LCU is to be filtered using the ALF operation; and generating, for inclusion in an encoded bitstream, a filter index identifying a filter from the set of filters that is to be used for filtering the first LCU.

In another example, a device for video coding includes a video decoder configured to receive, in a parameter set for a group of largest coding units (LCUs), information for constructing a set of filters for an adaptive loop filter (ALF) operation; receive, in the parameter set, an indication of how to divide the group of LCUs into sub-groups of LCUs; assign each of the sub-groups of LCUs to a filter from the set of filters; receive an indication that indicates that a first LCU is to be filtered using the ALF operation, wherein the first LCU is in a first sub-group of LCUs; determine a filter for the first LCU based on the indication that the first LCU is to be fileted by the ALF and based on the indication of how to divide the group of LCUs into the sub-group of LCUs, wherein the filter for the first LCU corresponds to a filter assigned to the first sub-group of LCUs; and filter one or more coded units (CUs) of the LCU using the filter for the first LCU.

In another example, a device for video coding includes a video decoder configured to receive, in a parameter set for a group of largest coding units (LCUs), information for constructing a set of filters for an adaptive loop filter (ALF) operation; determine for each filter in the set of filters an associated filter index; receive an indication that indicates that a first LCU is to be filtered using the ALF operation; and receive a filter index identifying a filter from the set of filters that is to be used for filtering the first LCU; and filter one or more coded unit (CUs) of the LCU using the filter from the set of filters.

In another example, a device for video coding includes a video encoder configured to generate for inclusion, in a parameter set for a group of largest coding units (LCUs), information for constructing a set of filters for an adaptive loop filter (ALF) operation; determine how to divide the group of LCUs into sub-groups of LCUs; determine for each sub-group of LCUs, an associated filter from the set of filters; determine a filter for a first LCU, wherein the first LCU is from a first sub-group of LCUs, wherein the filter for the first LCU corresponds to a filter associated with the first sub-group of LCUs; generate, for inclusion in the parameter set, an indication of how to divide the group of LCUs into the sub-groups of LCUs; and generate, for inclusion in an encoded bitstream, an indication that indicates that the first LCU is to be filtered using the filter associated with the first sub-group of LCUs.

In another example, a device for video coding includes a video encoder configured to generate for inclusion, in a parameter set for a group of largest coding units (LCUs), information for constructing a set of filters for an adaptive loop filter (ALF) operation; determine for each filter in the set of filters an associated filter index; determine for a first LCU a filter from the set of filters; generate, for inclusion in an encoded bitstream, an indication that indicates that a first LCU is to be filtered using the ALF operation; and generate, for inclusion in an encoded bitstream, a filter index identifying a filter from the set of filters that is to be used for filtering the first LCU.

In another example, a device for decoding video data includes means for receiving, in a parameter set for a group of largest coding units (LCUs), information for constructing a set of filters for an adaptive loop filter (ALF) operation; means for receiving, in the parameter set, an indication of how to divide the group of LCUs into sub-groups of LCUs; means for assigning each of the sub-groups of LCUs to a filter from the set of filters; means for receiving an indication that indicates that a first LCU is to be filtered using the ALF operation, wherein the first LCU is in a first sub-group of LCUs; means for determining a filter for the first LCU based on the indication that the first LCU is to be fileted by the ALF and based on the indication of how to divide the group of LCUs into the sub-group of LCUs, wherein the filter for the first LCU corresponds to a filter assigned to the first sub-group of LCUs; and means for filtering one or more coded units (CUs) of the LCU using the filter for the first LCU.

In another example, a device for decoding video data includes means for receiving, in a parameter set for a group of largest coding units (LCUs), information for constructing a set of filters for an adaptive loop filter (ALF) operation; means for determining for each filter in the set of filters an associated filter index; means for receiving an indication that indicates that a first LCU is to be filtered using the ALF operation; means for receiving a filter index identifying a filter from the set of filters that is to be used for filtering the first LCU; and means for filtering one or more coded unit (CUs) of the LCU using the filter from the set of filters.

In another example, a non-tangible computer readable storage medium storing instructions that when executed cause one or more processors to receive, in a parameter set for a group of largest coding units (LCUs), information for constructing a set of filters for an adaptive loop filter (ALF) operation; receive, in the parameter set, an indication of how to divide the group of LCUs into sub-groups of LCUs; assign each of the sub-groups of LCUs to a filter from the set of filters; receive an indication that indicates that a first LCU is to be filtered using the ALF operation, wherein the first LCU is in a first sub-group of LCUs; determine a filter for the first LCU based on the indication that the first LCU is to be fileted by the ALF and based on the indication of how to divide the group of LCUs into the sub-group of LCUs, wherein the filter for the first LCU corresponds to a filter assigned to the first sub-group of LCUs; and, filter one or more coded units (CUs) of the LCU using the filter for the first LCU.

In another example, a non-tangible computer readable storage medium stores instructions that when executed cause one or more processors to receive, in a parameter set for a group of largest coding units (LCUs), information for constructing a set of filters for an adaptive loop filter (ALF) operation; determine for each filter in the set of filters an associated filter index; receive an indication that indicates that a first LCU is to be filtered using the ALF operation; and receive a filter index identifying a filter from the set of filters that is to be used for filtering the first LCU; filter one or more coded unit (CUs) of the LCU using the filter from the set of filters.

The details of one or more examples are set forth in the accompanying drawings and the description below. Other features, objects, and advantages will be apparent from the description and drawings, and from the claims.

BRIEF DESCRIPTION OF DRAWINGS

FIGS. 6A and 6B are conceptual diagrams showing regions of a picture or frame that may be used for region adaptive loop filtering.

DETAILED DESCRIPTION

Figure 1:
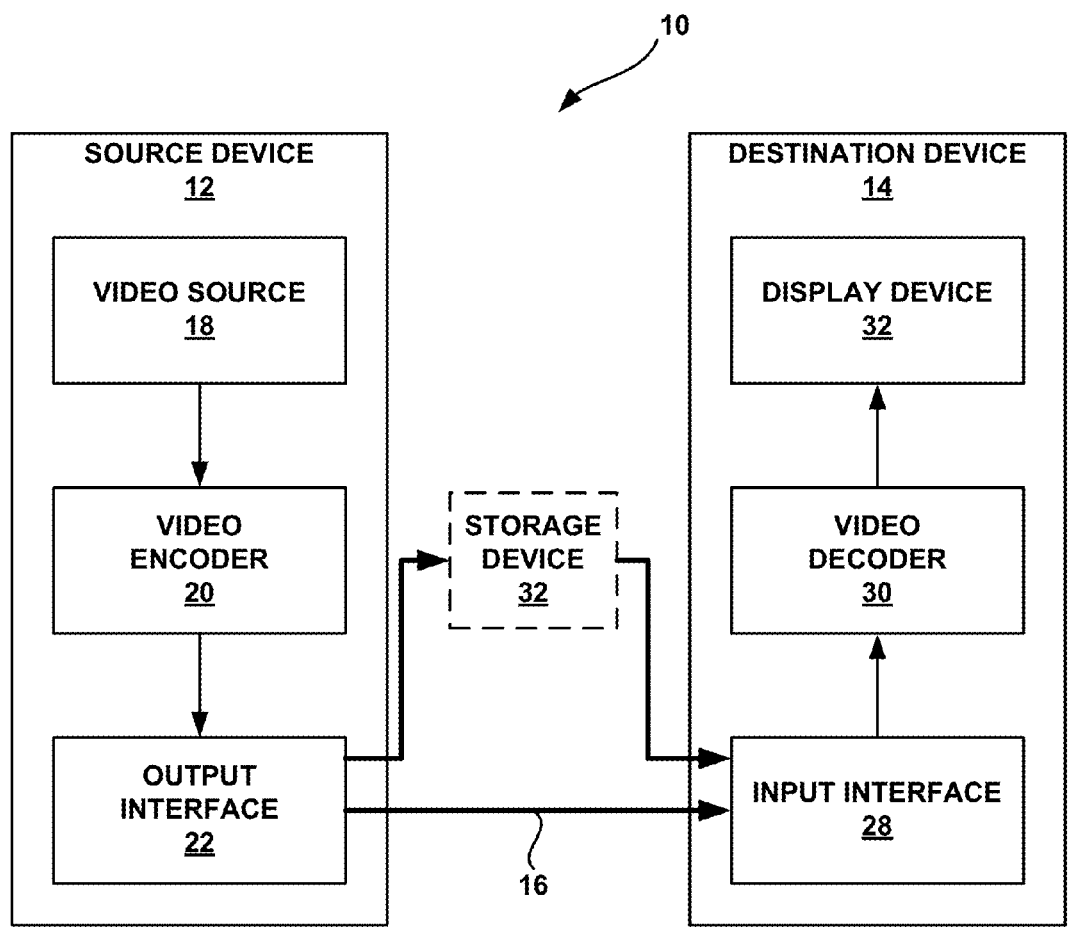
FIG. 1 is a block diagram illustrating an example video encoding and decoding system that may utilize the techniques described in this disclosure.

Video coding typically involves predicting a block of video data from either an already coded block of video data in the same picture (i.e. intra prediction) or an already coded block of video data in a different picture (i.e. inter prediction). In some instances, the video encoder also calculates residual data by comparing the predictive block to the original block. Thus, the residual data represents a difference between the predictive block and the original block. The video encoder transforms and quantizes the residual data and signals the transformed and quantized residual data in the encoded bitstream. A video decoder adds the residual data to the predictive block to produce a reconstructed video block that matches the original video block more closely than the predictive block alone. To further improve the quality of decoded video, a video decoder can perform one or more filtering operations on the reconstructed video blocks. Examples of these filtering operations include deblocking filtering, sample adaptive offset (SAO) filtering, and adaptive loop filtering (ALF). Parameters for these filtering operations may either be determined by a video encoder and explicitly signaled in the encoded video bitstream or may be implicitly determined by a video decoder.

This disclosure describes techniques associated with filtering reconstructed video data in a video encoding and/or video decoding processes and, more particularly, this disclosure describes techniques related to ALF. In accordance with this disclosure, filtering is applied at an encoder, and filter information is encoded in the bitstream to enable a decoder to identify the filtering that was applied at the encoder. The video encoder may test several different filters, and based on a rate-distortion analysis, choose a filter that produces a desired tradeoff between reconstructed video quality and compression quality. The video decoder receives encoded video data that includes the filter information, decodes the video data, and applies filtering based on the filtering information. In this way, the video decoder applies the same filtering that was applied at the video encoder.

Some proposals for ALF include a picture-based ALF approach, where a group of filters are signaled in an adaptation parameter set (APS) or picture parameter set (PPS) associated with a picture or frame. Which filter from the set of filters is applied to which pixels can be determined using either a block adaptive (BA) classification or a region adaptive (RA) classification. In one example of a BA classification, an activity metric (e.g. Laplacian activity) can be determined for a block of pixels. Based on the range in which the determined activity metric falls, a filter can be selected for the block. A range of activity metric values can have an associated filter. Therefore, a filter for a block can be selected based on the range with which the activity metric for the block falls. In some examples of a BA classification, more than one metric may be used. For example, a measure of Laplacian activity may be used as a first metric and a direction-based metric may be used as a second metric, and a filter may be selected based on the range of the two metrics. Aspects of applying a filter using a BA classification will be discussed in more detail below.

In an example of RA classification, a picture or frame can be divided into a fixed number of regions (e.g. 16 regions), and each region can have an associated filter. Each CU in the region can have an associated on/off flag indicating if the CU is to be filtered using the filter associated with the region or if the CU is not to be filtered. Whether a picture or frame is to be filtered using BA classifications or RA classifications can be signaled, for example, in an APS or SPS. Using an RA classification generally reduces video coder complexity relative to using a BA classification because the RA classification eliminates the need for the video decoder to calculate activity metrics for blocks. Aspects of applying a filter using an RA classification will be discussed in more detail below.

Some implementation proposals for ALF include a largest coding unit (LCU)-based ALF approach, where, in header data for each LCU, one of three options is signaled. The three options include (1) using a new filter for the LCU, (2) not performing ALF, or (3) signaling, using an index value, that a filter used for a previous LCU is to be used for the current LCU.

Other implementation proposals for ALF include combining aspects of both the picture-based and LCU-based techniques introduced above. For example, in some ALF implementations, a video encoder signals in an APS or SPS a set of global filters. For each LCU, the video encoder signals that (1) a filter for the LCU is to be selected from the global set of filters, (2) a new filter is to be used for the LCU, (3) a previously used filter is to be used for the LCU, or (4) ALF filtering is not to be applied to the LCU. If a filter is to be selected from the global set of filters, then the video decoder can select the filter using either the RA or BA classifications introduced above.

This disclosure introduces potential improvements to known ALF techniques. According to one technique of this disclosure, instead of implementing RA classification using a fixed set of regions, a variable number of regions in a picture can be used. The variable number of regions can be signaled from encoder to decoder by including in the encoded bitstream an indication of a number of regions to be used or by including an indication of the size of a region. If a number of regions to be included is signaled, then the video decoder can be configured to determine a size for the regions based on the number of regions. For each region, a filter associated with the region can be signaled.

As will be described in more detail below, according to the techniques of this disclosure, a parameter set (PS) option can be signaled in a parameter set. The various PS options that can be signaled include BA classification, traditional RA classification, modified RA classification, as well as other PS options. As described above, for each LCU, the video encoder may also signal an LCU option. The LCU options include, for example, that (1) a filter for the LCU is to be selected from the global set of filters based on the region of the LCU, (2) a new filter is to be used for the LCU, (3) a previously used filter is to be used for the LCU, or (4) ALF filtering is not to be applied to the LCU. The PS option and LCU option may be accompanied by other signaling. For example, when a PS option of modified RA classification is signaled, the parameter set may also include an indication of how to divide the picture or frame into regions. Similarly, when an LCU option (1) described above is signaled, the LCU header may also include an index to identify the selected filter. When an LCU option (2) described above is signaled, the LCU header may also include filter coefficients for constructing a new filter.

According to another technique of this disclosure, a global set of filters can be signaled in an APS or SPS from an encoder to a decoder, but instead of selecting filters from the global set based on an RA classification or a BA classification, a filter from the global set can be explicitly signaled, for a given block, using a filter ID associated with the filter. For each LCU, the video encoder signals that (1) a filter from the global set is to be used, (2) a new filter is to be used for the LCU, (3) a previously used filter is to be used for the LCU, or (4) ALF filtering is not to be applied to the LCU. If a filter from the global set is to be used, then the video encoder can signal the filter ID of the filter to be used. If a new filter is to be used, then the new filter can be saved with a filter ID, such that the new filter can be used for subsequent LCUs.

Although the techniques of this disclosure may at times be described in reference to in-loop filtering, the techniques may be applied to in-loop filtering, post-loop filtering, or other filtering schemes. In-loop filtering generally refers to filtering in which the filtered data is part of the encoding and decoding loops such that filtered data is used for predictive intra- or inter-coding. Post-loop filtering refers to filtering that is applied to reconstructed video data after the encoding loop. With post-loop filtering, the unfiltered data, as opposed to the filtered data, is used for predictive intra- or inter-coding. In some implementations, the type of filtering may switch between post-loop filtering and in-loop filtering on, for example, a frame-by-frame, slice-by-slice, or other such basis, and the decision of whether to use post-loop filtering or in-loop filtering can be signaled from encoder to decoder for each frame, slice, etc. The techniques of this disclosure are not limited to in-loop filtering or post filtering, and may apply to a wide range of filtering applied during video coding.

In this disclosure, the term "coding" refers to encoding or decoding. Similarly, the term "coder" generally refers to any video encoder, video decoder, or combined encoder/decoder (codec). Accordingly, the term "coder" is used herein to refer to a specialized computer device or apparatus that performs video encoding or video decoding.

Additionally, in this disclosure, the term "filter" generally refers to a set of filter coefficients. For example, a 3×3 filter may be defined by a set of 9 filter coefficients, a 5×5 filter may be defined by a set of 25 filter coefficients, a 9×5 filter may be defined by a set of 45 filter coefficients, and so on. The term "set of filters" generally refers to a group of one or more filters. For example, a set of two 3×3 filters, could include a first set of 9 filter coefficients and a second set of 9 filter coefficients. According to techniques described in this disclosure, for a series of video blocks, such as a frame, slice, or largest coding unit (LCU), information identifying sets of filters are signaled from the encoder to the decoder in a header for the series of the video blocks. The term "shape," sometimes called the "filter support," generally refers to the number of rows of filter coefficients and number of columns of filter coefficients for a particular filter. For example, 9×9 is an example of a first shape, 9×5 is an example of a second shape, and 5×9 is an example of a third shape. In some instances, filters may take non-rectangular shapes including diamond-shapes, diamond-like shapes, circular shapes, circular-like shapes, hexagonal shapes, octagonal shapes, cross shapes, X-shapes, T-shapes, other geometric shapes, or numerous other shapes or configurations.

FIG. 1 is a block diagram illustrating an example video encoding and decoding system 10 that may utilize the techniques described in this disclosure. As shown in FIG. 1, system 10 includes a source device 12 that generates encoded video data to be decoded at a later time by a destination device 14. Source device 12 and destination device 14 may comprise any of a wide range of devices, including desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or the like. In some cases, source device 12 and destination device 14 may be equipped for wireless communication.

Destination device 14 may receive the encoded video data to be decoded via a link 16. Link 16 may comprise any type of medium or device capable of moving the encoded video data from source device 12 to destination device 14. In one example, link 16 may comprise a communication medium to enable source device 12 to transmit encoded video data directly to destination device 14 in real-time. The encoded video data may be modulated according to a communication standard, such as a wireless communication protocol, and transmitted to destination device 14. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 12 to destination device 14.

Alternatively, encoded data may be output from output interface 22 to a storage device 32. Similarly, encoded data may be accessed from storage device 32 by input interface. Storage device 32 may include any of a variety of distributed or locally accessed data storage media such as a hard drive, Blu-ray discs, DVDs, CD-ROMs, flash memory, volatile or non-volatile memory, or any other suitable digital storage media for storing encoded video data. In a further example, storage device 32 may correspond to a file server or another intermediate storage device that may hold the encoded video generated by source device 12. Destination device 14 may access stored video data from storage device 32 via streaming or download. The file server may be any type of server capable of storing encoded video data and transmitting that encoded video data to the destination device 14. Example file servers include a web server (e.g., for a website), an FTP server, network attached storage (NAS) devices, or a local disk drive. Destination device 14 may access the encoded video data through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from storage device 32 may be a streaming transmission, a download transmission, or a combination of both.

The techniques of this disclosure are not necessarily limited to wireless applications or settings. The techniques may be applied to video coding in support of any of a variety of multimedia applications, such as over-the-air television broadcasts, cable television transmissions, satellite television transmissions, streaming video transmissions, e.g., via the Internet, encoding of digital video for storage on a data storage medium, decoding of digital video stored on a data storage medium, or other applications. In some examples, system 10 may be configured to support one-way or two-way video transmission to support applications such as video streaming, video playback, video broadcasting, and/or video telephony.

In the example of FIG. 1, source device 12 includes a video source 18, video encoder 20 and an output interface 22. In some cases, output interface 22 may include a modulator/demodulator (modem) and/or a transmitter. In source device 12, video source 18 may include a source such as a video capture device, e.g., a video camera, a video archive containing previously captured video, a video feed interface to receive video from a video content provider, and/or a computer graphics system for generating computer graphics data as the source video, or a combination of such sources. As one example, if video source 18 is a video camera, source device 12 and destination device 14 may form so-called camera phones or video phones. However, the techniques described in this disclosure may be applicable to video coding in general, and may be applied to wireless and/or wired applications.

The captured, pre-captured, or computer-generated video may be encoded by source device 12. The encoded video data may be transmitted directly to destination device 14 via output interface 22 of source device 20. The encoded video data may also (or alternatively) be stored onto storage device 32 for later access by destination device 14 or other devices, for decoding and/or playback.

Destination device 14 includes an input interface 28, a video decoder 30, and a display device 32. In some cases, input interface 28 may include a receiver and/or a modem. Input interface 28 of destination device 14 receives the encoded video data over link 16. The encoded video data communicated over link 16, or provided on storage device 32, may include a variety of syntax elements generated by video encoder 20 for use by a video decoder, such as video decoder 30, in decoding the video data. Such syntax elements may be included with the encoded video data transmitted on a communication medium, stored on a storage medium, or stored a file server.

Display device 32 may be integrated with, or external to, destination device 14. In some examples, destination device 14 may include an integrated display device and also be configured to interface with an external display device. In other examples, destination device 14 may be a display device. In general, display device 32 displays the decoded video data to a user, and may comprise any of a variety of display devices such as a liquid crystal display (LCD), a plasma display, an organic light emitting diode (OLED) display, or another type of display device.

Video encoder 20 and video decoder 30 may operate according to a video compression standard, such as the High Efficiency Video Coding (HEVC) standard presently under development, and may conform to the HEVC Test Model (HM). In some examples, video encoder 20 and video decoder 30 operate according to a video compression standard, such as the High Efficiency Video Coding (HEVC) standard presently under development. A draft of the upcoming HEVC standard, referred to as "HEVC Working Draft 6," is described in Bross et al., "High Efficiency Video Coding (HEVC) text specification draft 6," Joint Collaborative Team on Video Coding (JCT-VC) of ITU-T SG16 WP3 and ISO/IEC JTC1/SC29/WG11, 7th Meeting: Geneva, Switzerland, November, 2011, which, as of Apr. 5, 2013, is downloadable from http://phenix.int-evry.fr/jct/doc_en-d_user/documents/8_San%20Jose/wg11/JCTVC-H1003-v22.zip, the entire content of which is incorporated herein by reference. Another draft of the upcoming HEVC standard, referred to as "HEVC Working Draft 9," is described in Bross et al., "High Efficiency Video Coding (HEVC) text specification draft 9," Joint Collaborative Team on Video Coding (JCT-VC) of ITU-T SG16 WP3 and ISO/IEC JTC1/SC29/WG11, 11th Meeting: Shanghai, China, October, 2012, which, as of 8 Apr. 2013, is downloadable from http://phenix.int-evry.fr/jct/doc_end_user/documents/11_Shanghai/wg11/JCTVC-K1003-v8.zip, the entire content of which is incorporated herein by reference. As of Apr. 5, 2013, the latest specification of HEVC is described in Bross et al., "High Efficiency Video Coding (HEVC) text specification draft 10 (for FDIS & Consent)," Joint Collaborative Team on Video Coding (JCT-VC) of ITU-T SG16 WP3 and ISO/IEC JTC1/SC29/WG11, 12th Meeting: Geneva, CH, 14-23 Jan. 2013, which, as of 8 Apr. 2013, is downloadable from http://phenix.int-evry.fr/jct/doc_en-d_user/documents/12_Geneva/wg11/JCTVC-L1003-v20.zip, the entire content of which is incorporated herein by reference. The techniques of this disclosure, however, are not limited to any particular coding standard or technique.

Although not shown in FIG. 1, in some aspects, video encoder 20 and video decoder 30 may each be integrated with an audio encoder and decoder, and may include appropriate MUX-DEMUX units, or other hardware and software, to handle encoding of both audio and video in a common data stream or separate data streams. If applicable, in some examples, MUX-DEMUX units may conform to the ITU H.223 multiplexer protocol, or other protocols such as the user datagram protocol (UDP).

Video encoder 20 and video decoder 30 each may be implemented as any of a variety of suitable encoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 20 and video decoder 30 may be included in one or more encoders or decoders, either of which may be integrated as part of a combined encoder/decoder (CODEC) in a respective device.

The JCT-VC is working on development of the HEVC standard. The HEVC standardization efforts are based on an evolving model of a video coding device referred to as the HEVC Test Model (HM). The HM presumes several additional capabilities of video coding devices relative to existing devices according to, e.g., ITU-T H.264/AVC. For example, whereas H.264 provides nine intra-prediction encoding modes, the HM may provide as many as thirty-three intra-prediction encoding modes.

In general, the working model of the HM describes that a video frame or picture may be divided into a sequence of treeblocks or largest coding units (LCU) that include both luma and chroma samples. A treeblock has a similar purpose as a macroblock of the H.264 standard. A slice includes a number of consecutive treeblocks in coding order. A video frame or picture may be partitioned into one or more slices. Each treeblock may be split into coding units (CUs) according to a quadtree. For example, a treeblock, as a root node of the quadtree, may be split into four child nodes, and each child node may in turn be a parent node and be split into another four child nodes. A final, unsplit child node, as a leaf node of the quadtree, comprises a coding node, i.e., a coded video block. Syntax data associated with a coded bitstream may define a maximum number of times a treeblock may be split, and may also define a minimum size of the coding nodes.

A CU includes a coding node and prediction units (PUs) and transform units (TUs) associated with the coding node. A size of the CU corresponds to a size of the coding node and must be square in shape. The size of the CU may range from 8×8 pixels up to the size of the treeblock with a maximum of 64×64 pixels or greater. Each CU may contain one or more PUs and one or more TUs. Syntax data associated with a CU may describe, for example, partitioning of the CU into one or more PUs. Partitioning modes may differ between whether the CU is skip or direct mode encoded, intra-prediction mode encoded, or inter-prediction mode encoded. PUs may be partitioned to be non-square in shape. Syntax data associated with a CU may also describe, for example, partitioning of the CU into one or more TUs according to a quadtree. A TU can be square or non-square in shape.

The HEVC standard allows for transformations according to TUs, which may be different for different CUs. The TUs are typically sized based on the size of PUs within a given CU defined for a partitioned LCU, although this may not always be the case. The TUs are typically the same size or smaller than the PUs. In some examples, residual samples corresponding to a CU may be subdivided into smaller units using a quadtree structure known as "residual quad tree" (RQT). The leaf nodes of the RQT may be referred to as transform units (TUs). Pixel difference values associated with the TUs may be transformed to produce transform coefficients, which may be quantized.

In general, a PU includes data related to the prediction process. For example, when the PU is intra-mode encoded, the PU may include data describing an intra-prediction mode for the PU. As another example, when the PU is inter-mode encoded, the PU may include data defining a motion vector for the PU. The data defining the motion vector for a PU may describe, for example, a horizontal component of the motion vector, a vertical component of the motion vector, a resolution for the motion vector (e.g., one-quarter pixel precision or one-eighth pixel precision), a reference picture to which the motion vector points, and/or a reference picture list (e.g., list 0, list 1, or List C) for the motion vector.

In general, a TU is used for the transform and quantization processes. A given CU having one or more PUs may also include one or more transform units (TUs). Following prediction, video encoder 20 may calculate residual values corresponding to the PU. The residual values comprise pixel difference values that may be transformed into transform coefficients, quantized, and scanned using the TUs to produce serialized transform coefficients for entropy coding. This disclosure typically uses the term "video block" to refer to a coding node of a CU. In some specific cases, this disclosure may also use the term "video block" to refer to a treeblock, i.e., LCU, or a CU, which includes a coding node and PUs and TUs.

Figure 2A:
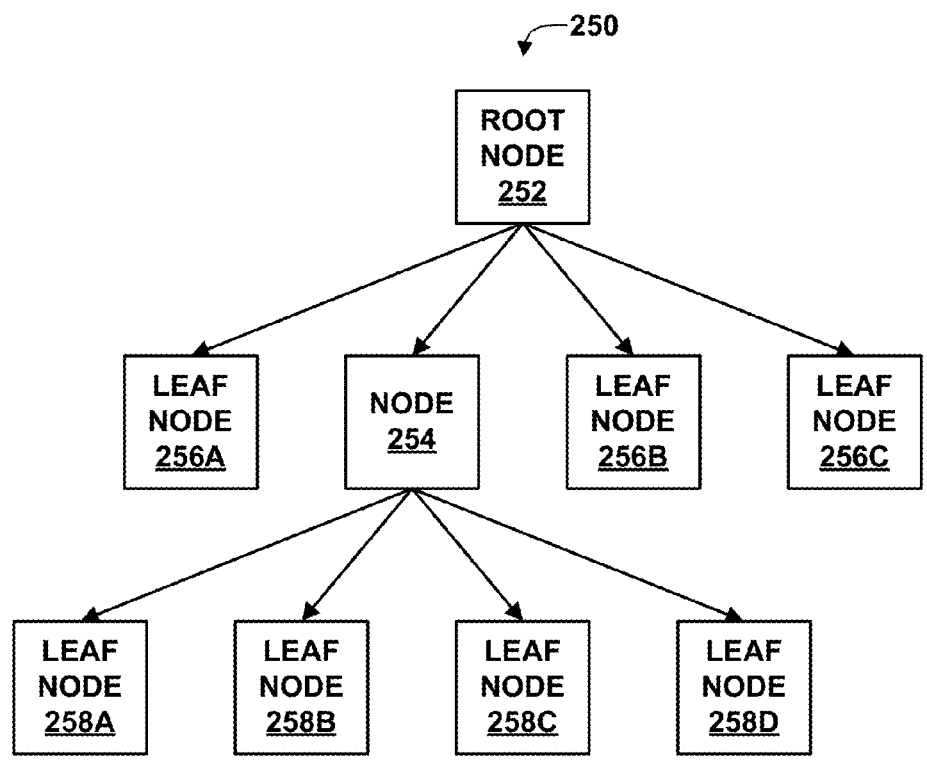
FIGS. 2A and 2B are conceptual diagrams illustrating an example of quadtree partitioning applied to a largest coding unit (LCU).
Figure 2B:
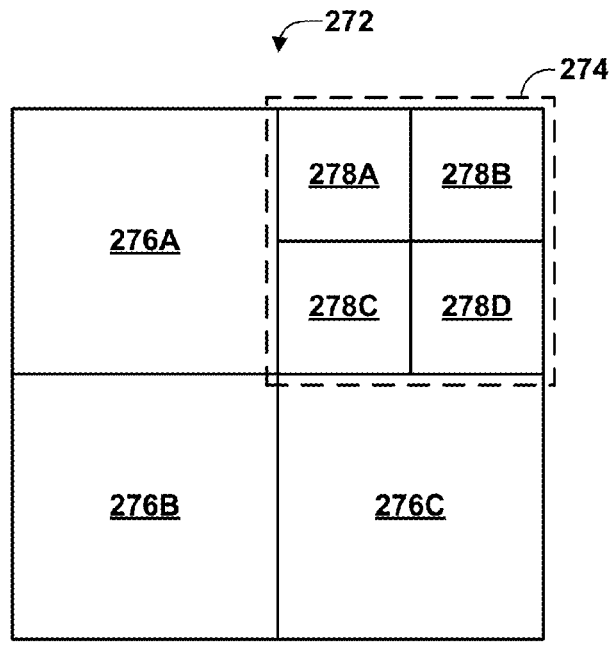

FIGS. 2A and 2B are conceptual diagrams illustrating an example quadtree 250 and a corresponding LCU 272. FIG. 2A depicts an example quadtree 250, which includes nodes arranged in a hierarchical fashion. Each node in a quadtree, such as quadtree 250, may be a leaf node with no children, or have four child nodes. In the example of FIG. 2A, quadtree 250 includes root node 252. Root node 252 has four child nodes, including leaf nodes 256A-256C (leaf nodes 256) and node 254. Because node 254 is not a leaf node, node 254 includes four child nodes, which in this example, are leaf nodes 258A-258D (leaf nodes 258).

Quadtree 250 may include data describing characteristics of a corresponding LCU, such as LCU 272 in this example. For example, quadtree 250, by its structure, may describe splitting of the LCU into sub-CUs. Assume that LCU 272 has a size of 2N×2N. LCU 272, in this example, has four sub-CUs 276A-276C (sub-CUs 276) and 274, each of size N×N. Sub-CU 274 is further split into four sub-CUs 278A-278D (sub-CUs 278), each of size N/2×N/2. The structure of quadtree 250 corresponds to the splitting of LCU 272, in this example. That is, root node 252 corresponds to LCU 272, leaf nodes 256 correspond to sub-CUs 276, node 254 corresponds to sub-CU 274, and leaf nodes 258 correspond to sub-CUs 278.

Data for nodes of quadtree 250 may describe whether the CU corresponding to the node is split. If the CU is split, four additional nodes may be present in quadtree 250. In some examples, a node of a quadtree may be implemented similar to the following pseudocode:

```
quadtree_node {
    boolean split_flag(1);
    // signaling data
    if (split_flag) {
        quadtree_node child 1;
        quadtree_node child2;
        quadtree_node child3;
        quadtree_node child4;
    }
}
```

The split_flag value may be a one-bit value representative of whether the CU corresponding to the current node is split. If the CU is not split, the split_flag value may be '0', while if the CU is split, the split_flag value may be '1'. With respect to the example of quadtree 250, an array of split flag values may be 101000000.

In some examples, each of sub-CUs 276 and sub-CUs 278 may be intra-prediction encoded using the same intra-prediction mode. Accordingly, video encoder 20 may provide an indication of the intra-prediction mode in root node 252. Moreover, certain sizes of sub-CUs may have multiple possible transforms for a particular intra-prediction mode. Video encoder 20 may provide an indication of the transform to use for such sub-CUs in root node 252. For example, sub-CUs of size N/2×N/2 may have multiple possible transforms available. Video encoder 20 may signal the transform to use in root node 252. Accordingly, video decoder 30 may determine the transform to apply to sub-CUs 278 based on the intra-prediction mode signaled in root node 252 and the transform signaled in root node 252.

As such, video encoder 20 need not signal transforms to apply to sub-CUs 276 and sub-CUs 278 in leaf nodes 256 and leaf nodes 258, but may instead simply signal an intra-prediction mode and, in some examples, a transform to apply to certain sizes of sub-CUs, in root node 252, in accordance with the techniques of this disclosure. In this manner, these techniques may reduce the overhead cost of signaling transform functions for each sub-CU of an LCU, such as LCU 272.

In some examples, intra-prediction modes for sub-CUs 276 and/or sub-CUs 278 may be different than intra-prediction modes for LCU 272. Video encoder 20 and video decoder 30 may be configured with functions that map an intra-prediction mode signaled at root node 252 to an available intra-prediction mode for sub-CUs 276 and/or sub-CUs 278. The function may provide a many-to-one mapping of intra-prediction modes available for LCU 272 to intra-prediction modes for sub-CUs 276 and/or sub-CUs 278. A slice may be divided into video blocks (or LCUs) and each video block may be partitioned according to the quadtree structure described in relation to FIGS. 2A-B.

In some examples, intra-prediction modes for sub-CUs 276 and/or sub-CUs 278 may be different than intra-prediction modes for LCU 272. Video encoder 20 and video decoder 30 may be configured with functions that map an intra-prediction mode signaled at root node 252 to an available intra-prediction mode for sub-CUs 276 and/or sub-CUs 278. The function may provide a many-to-one mapping of intra-prediction modes available for LCU 272 to intra-prediction modes for sub-CUs 276 and/or sub-CUs 278.

Figure 2D:
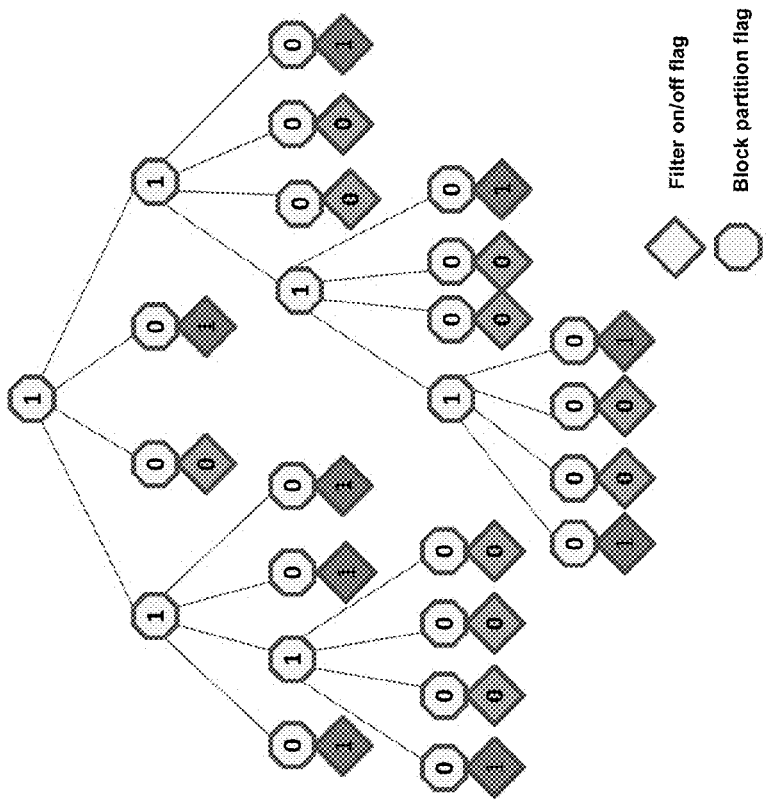
FIGS. 2C and 2D are conceptual diagrams illustrating an example of a filter map for a series of video blocks corresponding to the example quadtree partitioning of FIGS. 2A and 2B.
Figure 2C:
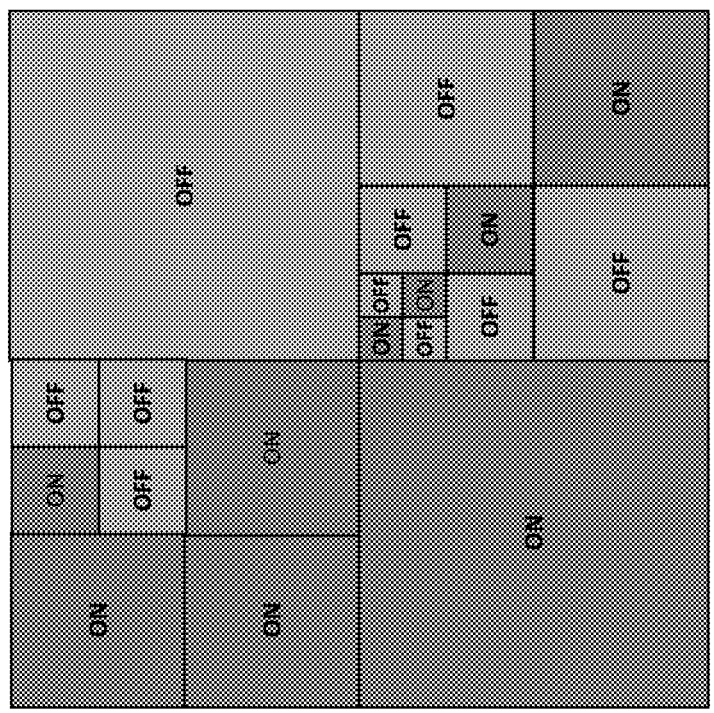

A slice may be divided into video blocks (or LCUs) and each video block may be partitioned according to the quadtree structure described in relation to FIGS. 2A-B. Additionally, as shown in FIG. 2C, the quadtree sub-blocks indicated by "ON" may be filtered by loop filters described herein, while quadtree sub-blocks indicated by "OFF" may not be filtered. The decision of whether or not to filter a given block or sub-block may be determined at the encoder by comparing the filtered result and the non-filtered result relative to the original block being coded. FIG. 2D is a decision tree representing partitioning decisions that result in the quadtree partitioning shown in FIG. 2C. The actual filtering applied to any pixels for "ON" blocks, may be determined based on the metrics discussed herein.

In particular, FIG. 2C may represent a relatively large video block that is partitioned according to a quadtree portioning scheme into smaller video blocks of varying sizes. Each video block is labelled (on or off) in FIG. 2C, to illustrate whether filtering should be applied or avoided for that video block. The video encoder may define this filter map by comparing filtered and unfiltered versions of each video block to the original video block being coded.

Again, FIG. 2D is a decision tree corresponding to partitioning decisions that result in the quadtree partitioning shown in FIG. 2C. In FIG. 2D, each circle may correspond to a CU. If the circle includes a "1" flag, then that CU is further partitioned into four more CUs, but if the circle includes a "0" flag, then that CU is not partitioned any further. Each circle (e.g., corresponding to CUs) also includes an associated diamond. If the flag in the diamond for a given CU is set to 1, then filtering is turned "ON" for that CU, but if the flag in the diamond for a given CU is set to 0, then filtering is turned off. In this manner, FIGS. 2C and 2D may be individually or collectively viewed as a filter map that can be generated at an encoder and communicated to a decoder at least once per slice of encoded video data in order to communicate the level of quadtree partitioning for a given video block (e.g., an LCU) whether or not to apply filtering to each partitioned video block (e.g., each CU within the LCU).

Smaller video blocks can provide better resolution, and may be used for locations of a video frame that include high levels of detail. Larger video blocks can provide greater coding efficiency, and may be used for locations of a video frame that include a low level of detail. A slice may be considered to be a plurality of video blocks and/or sub-blocks. Each slice may be an independently decodable series of video blocks of a video frame. Alternatively, frames themselves may be decodable series of video blocks, or other portions of a frame may be defined as decodable series of video blocks. The term "series of video blocks" may refer to a series of any independently decodable portions of a video frame such as an entire frame, a slice of a frame, a group of pictures (GOP) also referred to as a sequence, or another independently decodable unit defined according to applicable coding techniques. Aspects of this disclosure might be described in reference to frames or slices, but such references are merely exemplary. It should be understood that generally any series of video blocks may be used instead of a frame or a slice.

Syntax data may be defined on a per-coded-unit basis such that each CU includes associated syntax data. The filter information described herein may be part of such syntax for a CU, but might more likely be part of syntax for a series of video blocks, such as a frame, a slice, a GOP, LCU, or a sequence of video frames, instead of for a CU. The syntax data can indicate the set or sets of filters to be used with CUs of the slice or frame. Additionally, not all filter information necessarily has to be included in the header of a common series of video blocks. For example, filter description syntax might be transmitted in a frame header, while other filter information is signaled in a header for an LCU.

Video encoder 20 may perform predictive coding in which a video block being coded is compared to a predictive frame (or other CU) in order to identify a predictive block. The differences between the current video block being coded and the predictive block are coded as a residual block, and prediction syntax is used to identify the predictive block. The residual block may be transformed and quantized. Transform techniques may comprise a DCT process or conceptually similar process, integer transforms, wavelet transforms, or other types of transforms. In a DCT process, as an example, the transform process converts a set of pixel values into transform coefficients, which may represent the energy of the pixel values in the frequency domain. Quantization is typically applied to the transform coefficients, and generally involves a process that limits the number of bits associated with any given transform coefficient.

A video sequence typically includes a series of video frames or pictures. A group of pictures (GOP) generally comprises a series of one or more of the video pictures. A GOP may include syntax data in a header of the GOP, a header of one or more of the pictures, or elsewhere, that describes a number of pictures included in the GOP. Each slice of a picture may include slice syntax data that describes an encoding mode for the respective slice. Video encoder 20 typically operates on video blocks within individual video slices in order to encode the video data. A video block may correspond to a coding node within a CU. The video blocks may have fixed or varying sizes, and may differ in size according to a specified coding standard.

As an example, the HM supports prediction in various PU sizes. Assuming that the size of a particular CU is 2N×2N, the HM supports intra-prediction in PU sizes of 2N×2N or N×N, and inter-prediction in symmetric PU sizes of 2N×2N, 2N×N, N×2N, or N×N. The HM also supports asymmetric partitioning for inter-prediction in PU sizes of 2N×nU, 2N×nD, nL×2N, and nR×2N. In asymmetric partitioning, one direction of a CU is not partitioned, while the other direction is partitioned into 25% and 75%. The portion of the CU corresponding to the 25% partition is indicated by an "n" followed by an indication of "Up", "Down," "Left," or "Right." Thus, for example, "2N×nU" refers to a 2N×2N CU that is partitioned horizontally with a 2N×0.5N PU on top and a 2N×1.5N PU on bottom.

In this disclosure, "N×N" and "N by N" may be used interchangeably to refer to the pixel dimensions of a video block in terms of vertical and horizontal dimensions, e.g., 16×16 pixels or 16 by 16 pixels. In general, a 16×16 block will have 16 pixels in a vertical direction (y=16) and 16 pixels in a horizontal direction (x=16). Likewise, an N×N block generally has N pixels in a vertical direction and N pixels in a horizontal direction, where N represents a non-negative integer value. The pixels in a block may be arranged in rows and columns. Moreover, blocks need not necessarily have the same number of pixels in the horizontal direction as in the vertical direction. For example, blocks may comprise N×M pixels, where M is not necessarily equal to N.

Following intra-predictive or inter-predictive coding using the PUs of a CU, video encoder 20 may calculate residual data for the TUs of the CU. The PUs may comprise pixel data in the spatial domain (also referred to as the pixel domain) and the TUs may comprise coefficients in the transform domain following application of a transform, e.g., a discrete cosine transform (DCT), an integer transform, a wavelet transform, or a conceptually similar transform to residual video data. The residual data may correspond to pixel differences between pixels of the unencoded picture and prediction values corresponding to the PUs. Video encoder 20 may form the TUs including the residual data for the CU, and then transform the TUs to produce transform coefficients for the CU.

Following any transforms to produce transform coefficients, video encoder 20 may perform quantization of the transform coefficients. Quantization generally refers to a process in which transform coefficients are quantized to possibly reduce the amount of data used to represent the coefficients, providing further compression. The quantization process may reduce the bit depth associated with some or all of the coefficients. For example, an n-bit value may be rounded down to an m-bit value during quantization, where n is greater than m.

In some examples, video encoder 20 may utilize a predefined scan order to scan the quantized transform coefficients to produce a serialized vector that can be entropy encoded. In other examples, video encoder 20 may perform an adaptive scan. After scanning the quantized transform coefficients to form a one-dimensional vector, video encoder 20 may entropy encode the one-dimensional vector according to, for example, context adaptive binary arithmetic coding (CABAC). Examples of other entropy coding techniques that may also be used include, for example, context adaptive variable length coding (CAVLC), syntax-based context-adaptive binary arithmetic coding (SBAC), and probability interval partitioning entropy (PIPE) coding, as well as other entropy encoding methodology. Video encoder 20 may also entropy encode syntax elements associated with the encoded video data for use by video decoder 30 in decoding the video data.

To perform CABAC, video encoder 20 may assign a context within a context model to a symbol to be transmitted. The context may relate to, for example, whether neighboring values of the symbol are non-zero or not. To perform CAVLC, video encoder 20 may select a variable length code for a symbol to be transmitted. Codewords in VLC may be constructed such that relatively shorter codes correspond to more probable symbols, while longer codes correspond to less probable symbols. In this way, the use of VLC may achieve a bit savings over, for example, using equal-length codewords for each symbol to be transmitted. The probability determination may be based on a context assigned to the symbol.

Video encoder 20 may be configured to apply ALF in accordance with the techniques of this disclosure. In particular, video encoder 20 may determine a filter that produces a desired rate-distortion tradeoff for a particular portion of video data and include information in the encoded bitstream that enables video decoder 30 to identify that same filter. The rate-distortion tradeoff for a particular portion of video data may, for example, be a function of the number of bits needed to signal a particular and the quality of reconstructed video data obtained using that filtering scheme. What constitutes a desired rate-distortion tradeoff may vary depending on many factors, including how much bandwidth is available to transmit video data, how much storage space is available to store video data, what quality of video a user desires, and numerous other factors.

Current implementations of adaptive loop filtering (ALF) can utilize different ALF techniques, including picture-based ALF and LCU based ALF. In picture-based ALF, an encoder signals filters for a whole frame based on block adaptive (BA) classification techniques or region adaptive (RA) classification techniques. BA classification techniques include, for example, using one or more metrics such as a direction metric or an activity metric (e.g. Laplacian activity) to classify pixels or blocks of pixels. Based on the classification, a filter from a set of filters can be selected for the pixel or block of pixels. An encoder and decoder can determine the same metrics for a pixel or block of pixels, and based on those metrics, identify a filter from a set of filters (e.g., signaled in a picture parameter set or a slice header) to apply to that pixel or block of pixels. In this manner, an encoder does not need to explicitly signal a filter for each pixel or block of pixels.

RA classification techniques include classifying whole frames, i.e., pictures into sixteen rectangular regions (i.e., R(i,j) with i,j=0, . . . , 3), with each region being associated with a group of CUs. For each CU, a coder can determine whether to filter the CU with the filter associated with the region containing the CU or whether to not filter the CU. When using BA and RA techniques, multiple BA classification or RA classification regions can be merged. For example, multiple BA classification regions may be indexed to the same filter from a set of filters, indicating that such filter is to be used for all of the multiple BA classification regions. Similarly, multiple RA classification regions can be indexed to the same filter, indicating that such filter is to be used for all of the multiple RA classification regions. In some implementations, filter coefficients for a set of filters can be signaled in a parameter set associated with a group of LCUs. The filter coefficients may, for example, be signaled as part of an adaptive parameter set for a picture, or possibly in another location such as a picture parameter set or a slice header. CU level on/off flags may be signaled, for instance, in a slice header.

Figure 3:
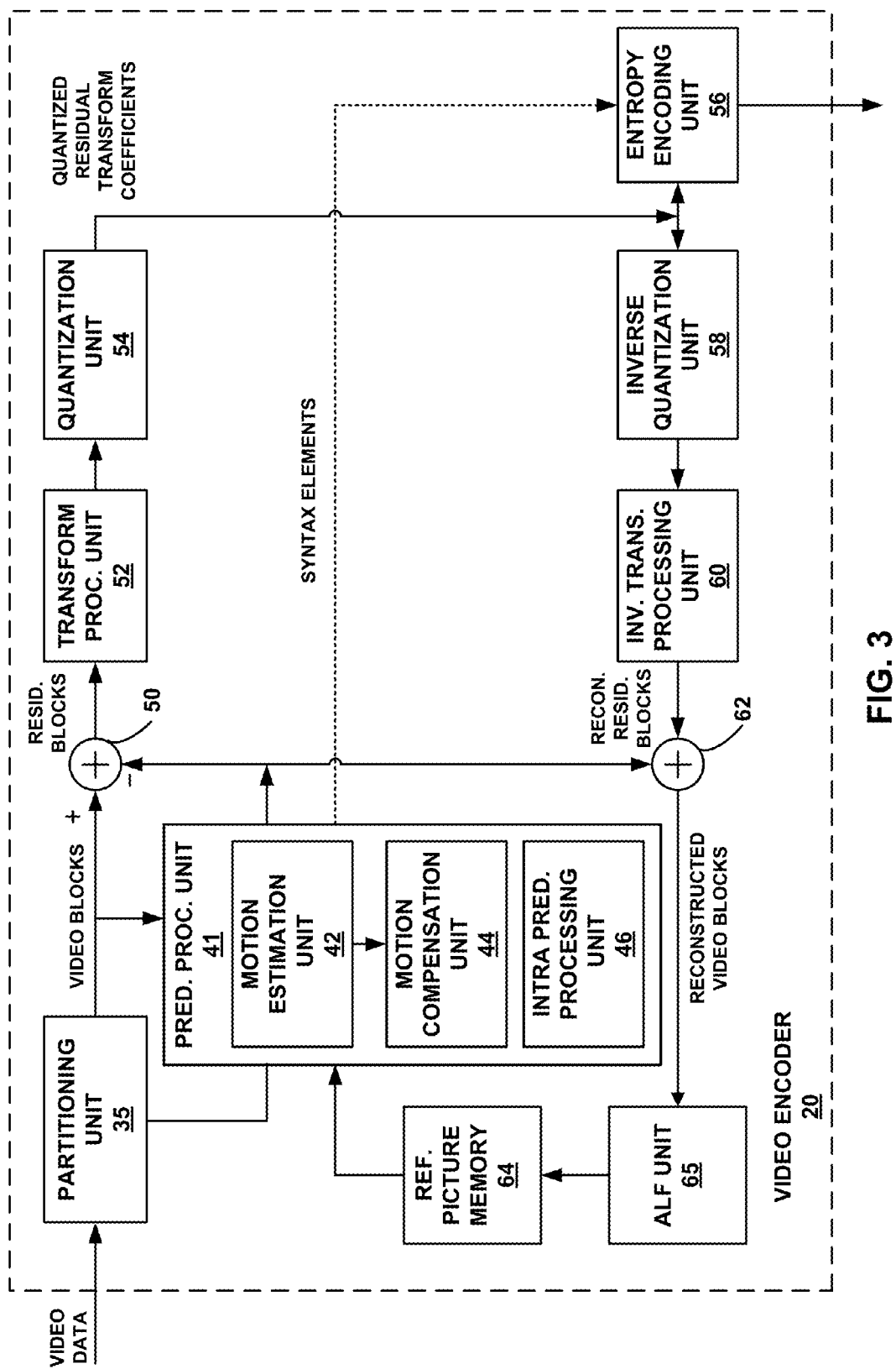
FIG. 3 is a block diagram illustrating an example video encoder that may implement the techniques described in this disclosure.

FIG. 3 is a block diagram illustrating an example video encoder 20 that may implement the techniques described in this disclosure. Video encoder 20 may perform intra- and inter-coding of video blocks within video slices. Intra-coding relies on spatial prediction to reduce or remove spatial redundancy in video within a given video frame or picture. Inter-coding relies on temporal prediction to reduce or remove temporal redundancy in video within adjacent frames or pictures of a video sequence. Intra-mode (I mode) may refer to any of several spatial based compression modes. Inter-modes, such as uni-directional prediction (P mode) or bi-prediction (B mode), may refer to any of several temporal-based compression modes.

In the example of FIG. 3, video encoder 20 includes a partitioning unit 35, prediction processing unit 41, reference picture memory 64, summer 50, transform unit 52, quantization unit 54, and entropy encoding unit 56. Prediction processing unit 41 includes motion estimation unit 42, motion compensation unit 44, and intra prediction processing unit 46. For video block reconstruction, video encoder 20 also includes inverse quantization unit 58, inverse transform processing unit 60, summer 62, and adaptive loop filter (ALF) unit 65. A deblocking filter (not shown in FIG. 3) may also be included to filter block boundaries to remove blockiness artifacts from reconstructed video or to improve the overall quality of reconstructed video. If desired, the deblocking filter would typically filter the output of summer 62. Additional loop filters (in loop or post loop), such as a sample adaptive offset (SAO) filter, may also be used in addition to the deblocking filter and ALF unit 65. ALF unit 65 can be configured to perform the adaptive loop filtering techniques described above.

As shown in FIG. 3, video encoder 20 receives video data, and partitioning unit 35 partitions the data into video blocks. This partitioning may also include partitioning into slices, tiles, or other larger units, as wells as video block partitioning, e.g., according to a quadtree structure of LCUs and CUs. Video encoder 20 generally illustrates the components that encode video blocks within a video slice to be encoded. The slice may be divided into multiple video blocks (and possibly into sets of video blocks referred to as tiles). Prediction processing unit 41 may select one of a plurality of possible coding modes, such as one of a plurality of intra coding modes or one of a plurality of inter coding modes, for the current video block based on error results (e.g., coding rate and the level of distortion). Prediction processing unit 41 may provide the resulting intra- or inter-coded block to summer 50 to generate residual block data and to summer 62 to reconstruct the encoded block for use as a reference picture.

Intra prediction processing unit 46 within prediction processing unit 41 may perform intra-predictive coding of the current video block relative to one or more neighboring blocks in the same frame or slice as the current block to be coded to provide spatial compression. Motion estimation unit 42 and motion compensation unit 44 within prediction processing unit 41 perform inter-predictive coding of the current video block relative to one or more predictive blocks in one or more reference pictures to provide temporal compression.

Motion estimation unit 42 may be configured to determine the inter-prediction mode for a video slice according to a predetermined pattern for a video sequence. The predetermined pattern may designate video slices in the sequence as P slices, B slices or GPB slices. Motion estimation unit 42 and motion compensation unit 44 may be highly integrated, but are illustrated separately for conceptual purposes. Motion estimation, performed by motion estimation unit 42, is the process of generating motion vectors, which estimate motion for video blocks. A motion vector, for example, may indicate the displacement of a PU of a video block within a current video frame or picture relative to a predictive block within a reference picture.

A predictive block is a block that is found to closely match the PU of the video block to be coded in terms of pixel difference, which may be determined by sum of absolute difference (SAD), sum of square difference (SSD), or other difference metrics. In some examples, video encoder 20 may calculate values for sub-integer pixel positions of reference pictures stored in reference picture memory 64, which also may be referred to as a decoded picture buffer (DPB). For example, video encoder 20 may interpolate values of one-quarter pixel positions, one-eighth pixel positions, or other fractional pixel positions of the reference picture. Therefore, motion estimation unit 42 may perform a motion search relative to the full pixel positions and fractional pixel positions and output a motion vector with fractional pixel precision.

Motion estimation unit 42 calculates a motion vector for a PU of a video block in an inter-coded slice by comparing the position of the PU to the position of a predictive block of a reference picture. The reference picture may be selected from a first reference picture list (List 0) or a second reference picture list (List 1), each of which identify one or more reference pictures stored in reference picture memory 64. Motion estimation unit 42 sends the calculated motion vector to entropy encoding unit 56 and motion compensation unit 44.

Motion compensation, performed by motion compensation unit 44, may involve fetching or generating the predictive block based on the motion vector determined by motion estimation, possibly performing interpolations to sub-pixel precision. Upon receiving the motion vector for the PU of the current video block, motion compensation unit 44 may locate the predictive block to which the motion vector points in one of the reference picture lists. Video encoder 20 forms a residual video block by subtracting pixel values of the predictive block from the pixel values of the current video block being coded, forming pixel difference values. The pixel difference values form residual data for the block, and may include both luma and chroma difference components. Summer 50 represents the component or components that perform this subtraction operation. Motion compensation unit 44 may also generate syntax elements associated with the video blocks and the video slice for use by video decoder 30 in decoding the video blocks of the video slice.

Intra-prediction unit 46 may intra-predict a current block, as an alternative to the inter-prediction performed by motion estimation unit 42 and motion compensation unit 44, as described above. In particular, intra-prediction unit 46 may determine an intra-prediction mode to use to encode a current block. In some examples, intra-prediction unit 46 may encode a current block using various intra-prediction modes, e.g., during separate encoding passes, and intra-prediction unit 46 (or mode select unit 40, in some examples) may select an appropriate intra-prediction mode to use from the tested modes. For example, intra-prediction unit 46 may calculate rate-distortion values using a rate-distortion analysis for the various tested intra-prediction modes, and select the intra-prediction mode having the best rate-distortion characteristics among the tested modes. Rate-distortion analysis generally determines an amount of distortion (or error) between an encoded block and an original, unencoded block that was encoded to produce the encoded block, as well as a bit rate (that is, a number of bits) used to produce the encoded block. Intra-prediction unit 46 may calculate ratios from the distortions and rates for the various encoded blocks to determine which intra-prediction mode exhibits the best rate-distortion value for the block.

In any case, after selecting an intra-prediction mode for a block, intra-prediction unit 46 may provide information indicative of the selected intra-prediction mode for the block to entropy coding unit 56. Entropy coding unit 56 may encode the information indicating the selected intra-prediction mode in accordance with the techniques of this disclosure. Video encoder 20 may include in the transmitted bitstream configuration data, which may include a plurality of intra-prediction mode index tables and a plurality of modified intra-prediction mode index tables (also referred to as codeword mapping tables), definitions of encoding contexts for various blocks, and indications of a most probable intra-prediction mode, an intra-prediction mode index table, and a modified intra-prediction mode index table to use for each of the contexts.

After prediction processing unit 41 generates the predictive block for the current video block via either inter-prediction or intra-prediction, video encoder 20 forms a residual video block by subtracting the predictive block from the current video block. The residual video data in the residual block may be included in one or more TUs and applied to transform unit 52. Transform unit 52 transforms the residual video data into residual transform coefficients using a transform, such as a discrete cosine transform (DCT) or a conceptually similar transform. Transform unit 52 may convert the residual video data from a pixel domain to a transform domain, such as a frequency domain.

Transform unit 52 may send the resulting transform coefficients to quantization unit 54. Quantization unit 54 quantizes the transform coefficients to further reduce bit rate. The quantization process may reduce the bit depth associated with some or all of the coefficients. The degree of quantization may be modified by adjusting a quantization parameter. In some examples, quantization unit 54 may then perform a scan of the matrix including the quantized transform coefficients. Alternatively, entropy encoding unit 56 may perform the scan.

Following quantization, entropy encoding unit 56 entropy encodes the quantized transform coefficients. For example, entropy encoding unit 56 may perform context adaptive variable length coding (CAVLC), context adaptive binary arithmetic coding (CABAC), syntax-based context-adaptive binary arithmetic coding (SBAC), probability interval partitioning entropy (PIPE) coding or another entropy encoding methodology or technique. Following the entropy encoding by entropy encoding unit 56, the encoded bitstream may be transmitted to video decoder 30, or archived for later transmission or retrieval by video decoder 30. Entropy encoding unit 56 may also entropy encode the motion vectors and the other syntax elements for the current video slice being coded.

Inverse quantization unit 58 and inverse transform processing unit 60 apply inverse quantization and inverse transformation, respectively, to reconstruct the residual block in the pixel domain for later use as a reference block of a reference picture. Motion compensation unit 44 may calculate a reference block by adding the residual block to a predictive block of one of the reference pictures within one of the reference picture lists. Motion compensation unit 44 may also apply one or more interpolation filters to the reconstructed residual block to calculate sub-integer pixel values for use in motion estimation. Summer 62 adds the reconstructed residual block to the motion compensated prediction block produced by motion compensation unit 44 to produce a reference block for storage in reference picture memory 64. The reference block may be used by motion estimation unit 42 and motion compensation unit 44 as a reference block to inter-predict a block in a subsequent video frame or picture.

In order to further improve the quality of the reconstructed video blocks, one or more filters may be applied to the reconstructed video blocks produced by summer 62. For example, a deblocking filter (not shown in FIG. 3) may be included to filter block boundaries to remove blockiness artifacts from reconstructed video or to improve the overall quality of reconstructed video. If desired, the deblocking filter would typically filter the output of summer 62. Additional loop filters (in loop or post loop), such as a sample adaptive offset (SAO) filter, may also be used in addition to the deblocking filter and ALF 65. ALF 65 can be configured to perform the adaptive loop filtering techniques described above.

As has been introduced above, ALF 65 can determine a filter for the reconstructed video blocks using either an RA mode or a BA mode. In the BA mode, ALF 65 can determine one or metrics for a pixel or block of pixels, and based on the one or more metrics, determine a filter for the pixel or block of pixels. Ranges of values for the one or more metrics can be mapped to filters.

Figure 4A:
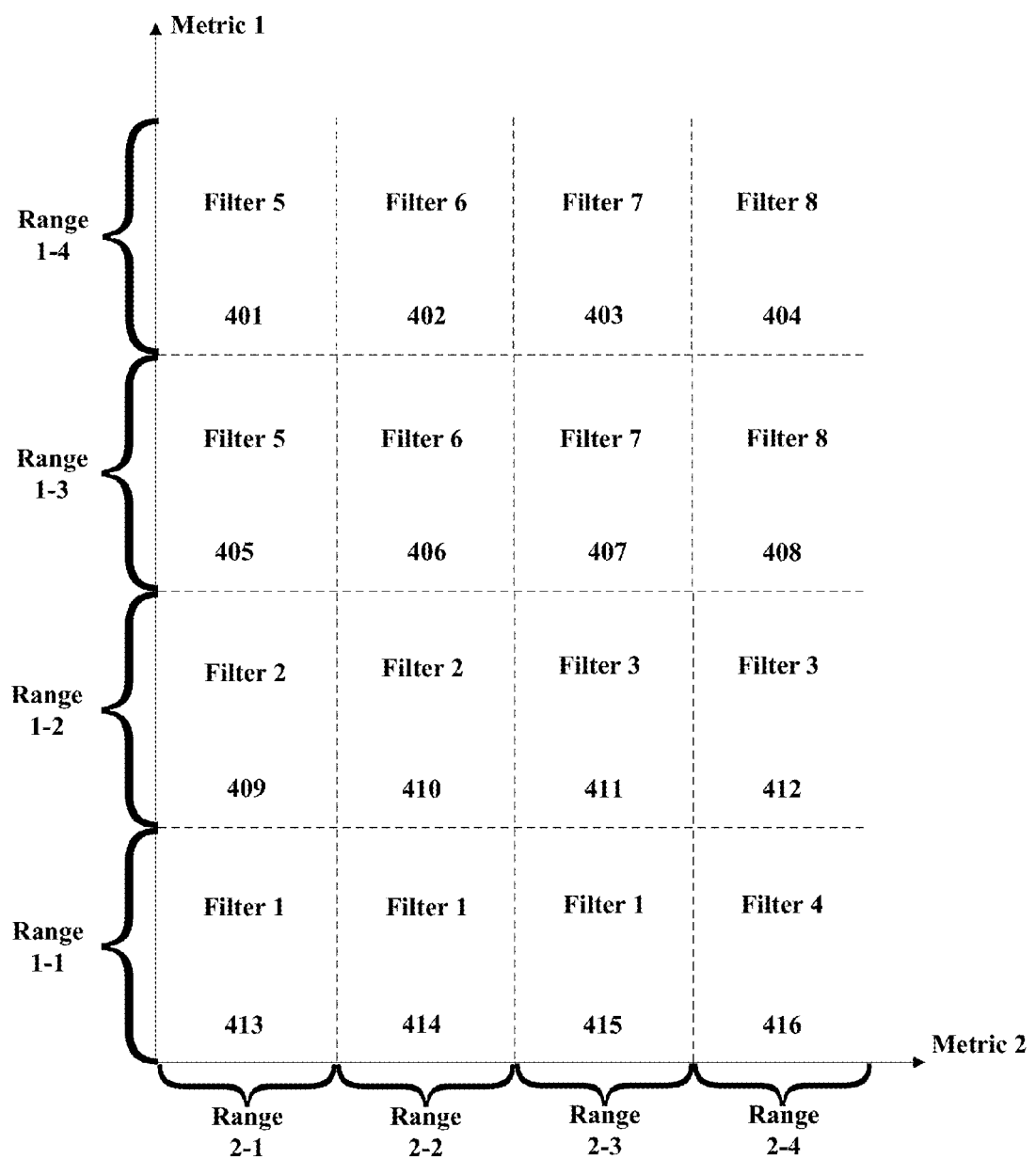
FIG. 4A is a conceptual diagram illustrating a mapping of ranges for two metrics to filters.

FIG. 4A is a conceptual diagram illustrating ranges of values for two metrics indexed to filters from a set of filters. The particular example of FIG. 4A shows eight filters (i.e. Filter 1, Filter 2 . . . Filter 8), but more or fewer filters may similarly be used. FIG. 4A shows two metrics that might be used for selecting a filter in accordance with the techniques of this disclosure. The two metrics may, for example, quantify properties of the pixel data related to non-direction specific activity (e.g. a sum-modified Laplacian value) and direction, direction-specific activity and edge detection, a direction metric and an edge metric, a horizontal activity metric and a vertical activity metric, or two other such metrics. Aspects of these metrics will be explained in greater detail below. In some instances, three or more metrics might be used, in which case the conceptual diagram of FIG. 4A would include a third dimension for mapping ranges of the metrics to filters from the set of filters. In some instances, only one metric might be used, in which case the conceptual diagram of FIG. 4A would only include one dimension.

In the example of FIG. 4A, a first metric (Metric 1) has four ranges (Ranges 1-1, 1-2, 1-3, and 1-4), and a second metric (Metric 2) also has four ranges (Ranges 2-1, 2-2, 2-3, and 2-4). Therefore, the example of FIG. 4A has sixteen combinations of ranges for Metric 1 and Metric 2. As can be seen from FIG. 4A, however, each combination is not necessarily associated with a unique filter. The combination of Range 1-1 and Range 2-1, as well as combinations 1-1 and 2-2, and 1-1 and 2-3, for instance, are all mapped to Filter 1, in the example of FIG. 4A. Filter 4, in contrast, is only mapped to one combination (1-1 and 2-4). Although the ranges of FIG. 4A are shown as being relatively equal, the sizes of ranges may vary. For example, in some implementations, Range 1-1 may encompass a greater range of values than Range 1-2. Additionally, although FIG. 4A shows Metric 1 and Metric 2 as having the same number of ranges, the number of ranges for a first metric and the number of ranges for a second metric do not necessarily need to be equal. If, for example, Metric 1 is a variance metric and Metric 2 is a direction metric, Metric 1 might use eight ranges while Metric 2 uses three ranges.

In some examples, the ranges of Metric 1 and Metric 2 may represent a continuous spectrum of values. For example, if Metric 1 is a sum-modified Laplacian value, Range 1-2 may correspond to more activity than Range 1-1 but less activity than Range 1-3, and Range 1-4 may correspond to more activity than Range 1-3. Within a range, the amount of activity determined for a particular pixel or group of pixels may similarly increase along the Metric 1 axis. In other examples, the ranges of Metric 1 and Metric 2 may not represent actual ranges but instead may represent discrete determinations. For example, if Metric 2 is a direction metric, Range 1-1 may correspond to a determination of no direction, Range 2-2 may correspond to a determination of horizontal direction, Range 2-3 may correspond to a determination of vertical direction, and Range 2-4 may represent a determination of diagonal direction. As will be described in more detail below, no direction, horizontal direction, vertical direction, and diagonal direction can be discrete determinations, and thus, the ranges for Metric 2 might not represent a continuous spectrum of values in the same way the ranges of Metric 1 do.

Figure 4B:
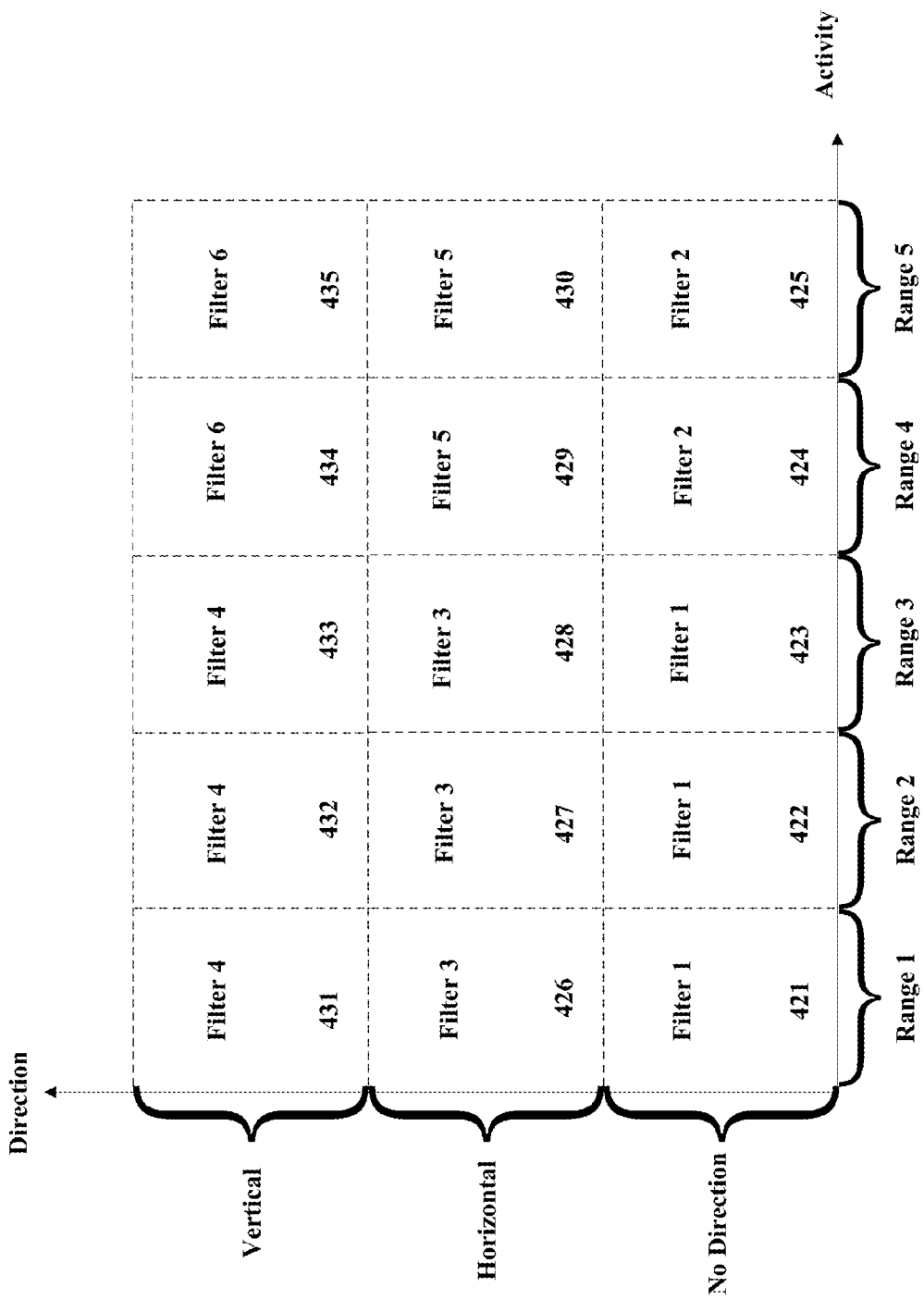
FIG. 4B is a conceptual diagram illustrating a mapping of ranges for an activity metric and a direction metric to filters.

FIG. 4B is a conceptual diagram illustrating ranges of values for an activity metric and a direction metric. In the example of FIG. 4B, the direction metric includes three discrete determinations (No Direction, Horizontal, and Vertical). Techniques for determining no direction, horizontal, and vertical as well as techniques for determining activity will be explained in greater detail below. The particular example of FIG. 4B shows six filters (i.e. Filter 1, Filter 2 . . . Filter 6), but more or fewer filters may similarly be used. As can be seen by FIG. 4B, the two metrics (activity and direction) create 15 combinations, identified as combinations 421 through 435. In some instances, however, additional combinations not explicitly shown in FIG. 4B may also be used. For example, a combination corresponding to no activity may be a 16th combination that also has a corresponding filter.

ALF unit 65 can store a mapping of filters to combinations of ranges of two or more metrics, such as the example mappings of FIGS. 4A and 4B, and use the mapping to determine which filter from a set of filters to apply to a particular pixel or group of pixels in a CU. The mapping of filters to combinations of ranges of two or more metrics may, for example, be determined by ALF unit 65 as part of the filter selection process described above. Regardless of how the mapping is determined, filter ALF unit 65 can generate information allowing a decoder to reconstruct the mapping. This information can be included in the coded bitstream to signal the mapping of combinations of ranges to filters. The mapping of combinations to ranges signaled may map range combinations to filter identifications IDs. The actual coefficients for a particular filter might be signaled separately.

Several different types of metrics can be used by ALF unit 65, shown in FIG. 3, in conjunction with the BA filtering techniques described in this disclosure. Some of these metrics are activity metrics that quantify activity associated with one or more blocks of pixels within the video data. Activity metrics can comprise variance metrics indicative of pixel variance within a set of pixels. As will be described, some of these activity metrics are direction-specific. For example, a horizontal activity metric quantifies activity along a horizontal axis, a vertical activity metric quantifies activity along a vertical axis, a diagonal activity metric quantifies activity along a diagonal axis, and so on.

Some activity metrics are not direction-specific. For example, a sum-modified Laplacian value is an activity metric based on a two-dimensional window of pixels that surround a current pixel or current group of pixels. For a current pixel (i,j), a sum-modified Laplacian value can be calculated as follows:

$$\text{var}(i, j) = \sum_{k=-K}^{K} \sum_{l=-L}^{L} |2R(i+k, j+l) - R(i+k-1, j+l) - R(i+k+1, j+l)| + |2R(i+k, j+l) - R(i+k, j+l-1) - R(i+k, j+l+1)| \quad (1)$$

where k represents a value of a summation of pixel values from −K to K and l represents a value of a summation from −L to L for a two-dimensional window that spans from −K to K and −L to L, wherein i and j represent pixel coordinates of the pixel data, RI(i,j) represents a given pixel value at coordinates i and j, and var(i,j) is the activity metric (i.e. the sum-modified Laplacian value).

The techniques of the present disclosure may also be implemented using direction-specific metrics for horizontal activity, vertical activity, and diagonal activity. Equations 2 and 3 show examples of how horizontal activity and vertical activity can be computed for a current pixel (x, y) by comparing a pixel value (Rec), such as intensity, of the current pixel to a pixel value of neighboring pixels.

$$Hor\_act(x,y) = R(2*Rec[x][y] - Rec[x+1][y] - Rec[x-1][y]) \quad (2)$$

$$Ver\_act(x,y) = R(2*Rec[x][y] - Rec[x][y+1] - Rec[x][y+1]) \quad (3)$$

As shown by equation 2, when determining horizontal activity, the current pixel (x,y) can be compared to a left neighbor pixel (x−1, y) and a right neighbor pixel (x+1, y). As shown by equation 3, when determining vertical activity, the current pixel can be compared to an upper neighbor pixel (x, y+1) and a lower neighbor pixel (x, y−1).

Equations 4 and 5 show examples of how diagonal activity can be computed for a current pixel (x, y) by comparing a pixel value (Rec) of the current pixel to pixel values of neighboring pixels.

$$45deg\_act(x,y) = R(2*Rec[x][y] - Rec[x+1][y+1] - Rec[x-1][y-1]) \quad (4)$$

$$135deg\_act(x,y) = R(2*Rec[x][y] - Rec[x-1][y+1] - Rec[x+1][y-1]) \quad (5)$$

As shown by equation 4, diagonal activity can be computed, for example, in the 45 degree direction by comparing a current pixel (x, y) to an upper-right neighbor pixel (x+1, y+1) and a lower-left neighbor pixel (x−1, y−1). As shown by equation 5, diagonal activity may also be in the 135 degree direction by comparing a current pixel (x, y) to a left-upper neighbor pixel (x−1, y+1) and a right-lower neighbor pixel (x+1, y−1).

Equations 2-5, above, illustrate how horizontal activity, vertical activity, and diagonal activity can be determined on a pixel-by-pixel basis, but in some implementations, horizontal activity, vertical activity, and diagonal activity may be determined on a group-by-group basis, where a group of pixels is a 2×2, 4×4, or M×N block of pixels. In such an implementation, horizontal activity, for example, can be determined by comparing pixel values of a current group to pixel values of a left group and a right group, in an analogous manner to equation 2; and, the vertical activity can be determined by comparing a current group to an upper group and a lower group, in an analogous manner to equation 3. Likewise, 45-degree diagonal activity can be determined by comparing a current group of pixels to an upper-right neighboring group and a lower-left neighboring group in an analogous manner to equation 4, and 135-degree diagonal activity can be determined by comparing a current group of pixels to an upper-left neighboring group and a lower-right neighboring group, in an analogous manner to equation 5.

In some implementations, horizontal activity, vertical activity, 45-degree diagonal activity, and 135-degree diagonal activity can be determined by comparing a current pixel or group of pixels to neighboring pixels or groups of pixels in only one direction. For example, instead of determining horizontal activity based on comparing a current pixel to a left neighbor and a right neighbor, horizontal activity might be determined based on only a left neighbor or only a right neighbor. Additionally, in some implementations, horizontal activity, vertical activity, 45-degree diagonal activity, and 135-degree diagonal activity may be determined using averages or weighted averages of areas of neighboring pixels instead of single neighboring pixels or single groups of pixels.

The values resulting from equations 2-5 can be divided into a finite number of ranges, such as 2, 4, 8, or any other finite number, and each range can be assigned a range identification. Referring back to FIG. 4A, for example, Range 1-1, Range 1-2, Range 2-1, etc. are all examples of range identifications. As one example, horizontal activity values can be divided into four ranges, and the ranges might be assigned IDs Range 1-1, Range 1-2, Range 1-3, and Range 1-4. Horizontal threshold values (i.e., $ThH_1, \ldots, ThH_{P-1}$) can determine where the ranges begin and end. Table 1 below shows the generic case of how horizontal IDs might be assigned to P ranges.

TABLE 1

Index of activity metric

| Condition of Hor_act_B | Horizontal ID |
| --- | --- |
| $Hor\_act\_B < ThH_1$ | Range 2-1 |
| $ThH_1 \leq Hor\_act\_B < ThH_2$ | Range 2-2 |
| ... | ... |
| $ThH_{P-1} \leq Hor\_act\_B$ | Range 2-P |

Using the example of Table 1, if a current pixel has a horizontal activity value greater than $ThH_1$ but less than $ThH_2$, then the current pixel is in range 2-2 for metric 2. Current pixels may be assigned to vertical ranges with Vertical IDs, 45-degree diagonal ranges with 45-degree diagonal IDS, and 135-degree diagonal ranges with 135-degree diagonal IDs, in a similar manner as described above in Table 1 for horizontal ranges and horizontal IDs.

Any of horizontal activity, vertical activity, 45-degree diagonal activity, and 135-degree diagonal activity can be used as a metric in accordance with the multi-metric filter filtering techniques described in this disclosure. For example, referring again back to FIG. 4A, Metric 1 might be a measure of vertical activity, and Metric 2 might be a measure of horizontal activity. In such an example, a filter unit, such as ALF unit 65 of FIG. 3 or ALF unit 91 of FIG. 91, can determine a filter for a pixel or group of pixels based on the horizontal activity of the pixel or group of pixel and the vertical activity of the pixel or group of pixels. If, for example, a current pixel has a horizontal activity metric that falls in Range 2-3 and a vertical activity metric that falls in range 1-3, then the filter unit filters the pixel using Filter 4. In a similar manner, combinations of 45-degree diagonal activity and 135-degree diagonal activity, 45-degree diagonal activity and horizontal activity, 45-degree diagonal activity and vertical activity, 135-degree diagonal activity and horizontal activity, or 135-degree diagonal activity and vertical activity may also be used by a filter unit for selecting a filter for a pixel or group of pixels. In some implementations, three or all four of horizontal activity, vertical activity, 45-degree diagonal activity, and 135-degree diagonal activity may be used by a filter unit for selecting a filter of a pixel or group of pixels.

In the implementations described above, horizontal activity, vertical activity, 45-degree diagonal activity, and 135-degree diagonal activity can all be used as metrics, as Metric 1 and/or Metric 2 in FIG. 4A, for example. In some implementations, however, horizontal activity, vertical activity, 45-degree diagonal activity, and 135-degree diagonal activity might not be metrics themselves, but instead can be used as intermediate determinations for determining an overall direction metric. The direction metric generally describes in which direction (e.g. no direction, horizontal, vertical, 45-degree diagonal, or 135-degree diagonal) the pixels are changing the most.

In one example, using only horizontal activity and vertical activity as described in equations 2 and 3, a direction for a pixel might be determined based on the following conditions:

Direction 1=horizontal,if
  $Hor\_activity > k1*Ver\_activity$

Direction 2=vertical,if $Ver\_activity > k2*Hor\_activity$

Direction 0=no direction,otherwise.

Constants, k1 and k2, can be selected such that the direction is only deemed to be direction 1 or direction 2 if horizontal activity is substantially greater than vertical activity or vertical activity is substantially greater than horizontal activity. If horizontal activity and vertical activity are equal or approximately equal, then the direction is direction 0. Direction 1 generally indicates that the pixel values are changing more in the horizontal direction than in the vertical direction, and direction 2 indicates that pixel values are changing more in the vertical direction than in the horizontal direction. Direction 0 indicates that the change in pixel values in the horizontal direction is approximately equal to the change in pixel values in the vertical direction.

The determined direction metric (e.g. direction 0, direction 1, direction 2) can be used as a metric in the multi-metric filtering techniques described in this disclosure. Using the example of FIG. 4A again, Metric 1 might be a variance metric, such as a sum-modified Laplacian value, while Metric 2 might be a direction determination as described above. As described in reference to FIG. 4A, each of direction 1, direction 2, and direction 0 can be associated with a range of Metric 2 even though direction 1, direction 2, and direction 0 represent finite determinations instead of a spectrum of values.

In addition to using only horizontal activity and vertical activity as described above, techniques of this disclosure also include using 45-degree diagonal activity and 135-degree diagonal activity, as described in equations 4 and 5, to determine directions, based on the following conditions:

Direction=1, if $45deg\_activity > k1*135deg\_acctivity$

Direction=2, if $135deg\_activity > k2*45deg\_activity$

Direction=0, otherwise.

Direction determinations based on 45-degree diagonal activity and 135-degree diagonal activity can be used as a metric with another metric, such as a sum-modified Laplacian value, as described above.

Additionally, a direction metric may also be determined, based on the following conditions:

Direction=1, if 45*deg*_activity>k1*135*deg*_acctivity, k2*Hor_activity, AND k3*Ver_activity Direction=2, if 135*deg*_activity>>k4*45*deg*_acctivity, k5*Hor_activity, AND k6*Ver_activity Direction=3, if Hor_activity>k7*Ver_activity, k8*135*deg*_activity, AND k9*45*deg*_acctivity Direction=4, if Ver_activity>k10*Hor_activity, k11*135*deg*_activity, AND k12*45*deg*_acctivity Direction=0, otherwise.

As described above, k1 through k12 are constants selected to determine how much greater than one of horizontal activity, vertical activity, 45-degree activity, and 135-degree activity needs to be compared to the others in order for a certain direction to be selected. Direction determinations based on horizontal activity, vertical activity, 45-degree diagonal activity, and 135-degree diagonal activity can be used as a metric with another metric, such as a sum-modified Laplacian value, as described above.

Another metric that can be used with the techniques of this disclosure includes an edge metric. An edge metric generally quantifies activity that might be indicative of the presence of an edge in a block of pixels. An edge may occur, for example, in a block of pixels if that block of pixels contains the boundary of an object within an image. One example of edge detection includes using a current pixel's four neighboring pixels (e.g., left, right, top, bottom) or using the current pixel's eight neighboring pixels (left, right, top, bottom, top right, top left, bottom right, bottom left). Additionally, edge type detection may include using two neighboring pixels, such as top and bottom, left and right, top left and bottom right, or top right and left bottom.

The pseudo code below shows examples of how edge information can be computed for a current pixel (x, y) by comparing a pixel value (Rec), such as intensity, of the current pixel to the pixel values of those neighboring pixels (i.e., 4/8 pixels).

An EdgeType variable is initiated to 0. Each time a statement is true, the EdgeType variable is either incremented by 1 (as shown in the pseudo code by EdgeType++) or decremented by 1 (as shown in the pseudo code by EdgeType--). Rec[x][y] refers to a pixel value, such as the pixel intensity, of the pixel located at (x, y). The first grouping of "if" statements are for comparing the current pixel to top, bottom, left, and right neighbors. The second grouping of "if" statements are for comparing the current pixel to the top-left, top-right, bottom-left, and bottom-right neighbors. The techniques of this disclosure can be implemented using either group or both groups.

```
EdgeType = 0;
if (Rec[x][y] > Rec[x-1][y]) EdgeType ++;
if (Rec[x][y] < Rec[x-1][y]) EdgeType --;
if (Rec[x][y] > Rec[x+1][y]) EdgeType ++;
if (Rec[x][y] < Rec[x+1][y]) EdgeType --;
if (Rec[x][y] > Rec[x][y-1]) EdgeType ++;
if (Rec[x][y] < Rec[x][y-1]) EdgeType --;
```

-continued

```
if (Rec[x][y] > Rec[x][y+1]) EdgeType ++;
if (Rec[x][y] < Rec[x][y+1]) EdgeType --;
if (Rec[x][y] > Rec[x-1][y-1]) EdgeType ++;
if (Rec[x][y] < Rec[x-1][y-1]) EdgeType --;
if (Rec[x][y] > Rec[x+1][y-1]) EdgeType ++;
if (Rec[x][y] < Rec[x+1][y-1]) EdgeType --;
if (Rec[x][y] > Rec[x-1][y+1]) EdgeType ++;
if (Rec[x][y] < Rec[x-1][y+1]) EdgeType --;
if (Rec[x][y] > Rec[x+1][y+1]) EdgeType ++;
if (Rec[x][y] < Rec[x+1][y+1]) EdgeType --;
```

If a current pixel is a local maximum, then the pixel value of the pixel will be greater than all its neighbors and will have an edge type of 4 if using four neighbors or an edge type of 8 if using eight neighbors. If a current pixel is a local minimum, then the pixel value of the pixel will be less than all its neighbors and will have an edge type of −4 if using four neighbors or an edge type of −8 if using eight neighbors. Thus, using the example techniques described above for determining an edge type between −4 and 4 or −8 and 8 can be used in determining a filter. The values determined for the edge type (i.e. values of −4 to 4 or values of −8 to 8) can be mapped to ranges of a metric, such as Metric 1 or Metric 2 of FIG. 4A. In some implementations, absolute values of the edge type determination might be mapped to ranges, such that an edge type of −3 and 3, for example, would map to the same filter.

The calculations of the various metrics described in this disclosure are only intended to be examples and are not exhaustive. For example, the metrics can be determined using windows or lines of pixels that include more neighboring pixels than described in this disclosure.

Additionally, in some implementations, the metrics described in this disclosure may be calculated using sub-sampling of the pixels in a particular line or window. For example, to calculate a block activity metric for a 4×4 block of pixels, metrics for activity and direction can be calculated as follows:

Direction Metric
Ver_act(i,j)=abs (X (i,j)<<1−X (i,j−1)−X(i,j+1))
Hor_act(i,j)=abs (X (i,j)<<1−X (i−1,j)−X(i+1,j))
$H_B = \Sigma_{i=0,2} \Sigma_{j=0,2}$ Hor_act(i,j)
$V_B = \Sigma_{i=0,2} \Sigma_{j=0,2}$ Vert_act(i,j)
Direction=0,1($H_B$>k1*$V_B$), 2($V_B$>k2*$H_B$)

Activity Metric
$L_B = H_B + V_B$
5 classes(0,1,2,3,4)

Metric
Combination of Activity and Direction (e.g. 15 or 16 combinations as explained above in the example of FIG. 4B)

Hor_act (i, j) generally refers to the horizontal activity of current pixel (i, j), and Vert_act(i, j) generally refers to the vertical activity of current pixel (i,j). X(i, j) generally refers to a pixel vale of pixel (i, j). $H_B$ refers to the horizontal activity of the 4×4 block, which in this example is determined based on a sum of horizontal activity for pixels (0, 0), (0, 2), (2, 0), and (2, 2). $V_B$ refers to the vertical activity of the 4×4 block, which in this example is determined based on a sum of vertical activity for pixels (0, 0), (0, 2), (2, 0), and (2, 2). "<<1" represents a multiply by two operation. As explained above, based on the values of $H_B$ and $V_B$, a direction can be determined. Using the example above, if the value of $H_B$ is more than k times the value of $V_B$, then the direction can be determined to be direction 1 (i.e. horizontal), which might correspond to more horizontal activity than vertical activity. If the value of $V_B$ is more than k times the value of $H_B$, then the direction can be determined to be direction 2 (i.e. vertical), which might correspond to more vertical activity than horizontal activity. Otherwise, the direction can be determined to be direction 0 (i.e. no direction), meaning neither horizontal nor vertical activity is dominant. The labels for the various directions and the ratios used to determine the directions merely constitute one example, as other labels and ratios can also be used.

Activity ($L_B$) for the 4×4 block can be determined as a sum of the horizontal and vertical activity. The value of $L_B$ can be classified into a range, as described above. This particular example shows five ranges although more or fewer ranges may similarly be used. Based on the combination of activity and direction, a filter for the 4×4 block of pixels can be selected. As described above, a filter may be selected based on a two-dimensional mapping of activity and direction to filters, as described in reference to FIGS. 4A and 4B, or activity and direction may be combined into a single metric, and that single metric may be used to select a filter.

Figure 5A:
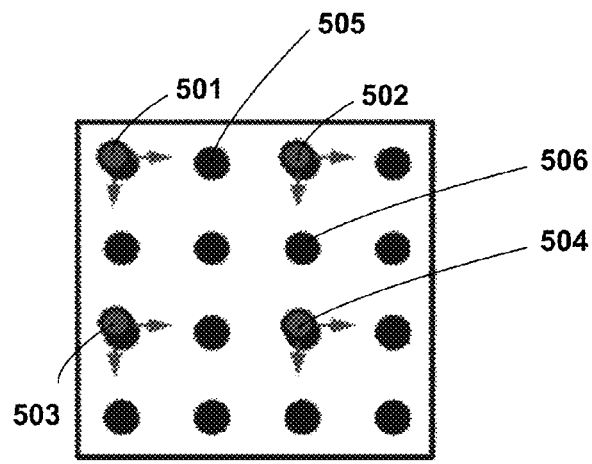
FIGS. 5A, 5B, and 5C show conceptual diagrams of a 4×4 block of pixels.

FIG. 5A represents a 4×4 block of pixels. Using the sub-sampling techniques described above, only four of the sixteen pixels are used. The four pixels are pixel (0, 0) which is labeled as pixel 501 pixel (2, 0) which is labeled as pixel 502, pixel (0, 2) which is labeled as pixel 503, and pixel (2, 2) which is labeled as pixel 504. The Horizontal activity of pixel 501 (i.e. hor_act(0, 0)), for example, is determined based on a left neighboring pixel and a right neighboring pixel. The right neighboring pixel is labeled as pixel 505. The left neighboring pixel is located in a different block than the 4×4 block and is not shown on FIG. 5A. The vertical activity of pixel 502 (i.e. ver_act(2, 0)), for example is determined based on an upper neighboring pixel and a lower neighboring pixel. The lower neighboring pixel is labeled as pixel 506, and the upper neighboring pixel is located in a different block than the 4×4 block and is not shown in FIG. 5A.

Generally using the same techniques described above, a block activity metric may also be calculated using a different subset of pixels as follows:
Direction Metric
Ver_act(i,j)=abs(X(i,j)<<1−X(i,j−1)−X(i,j+1))
Hor_act(i,j)=abs(X(i,j)<<1−X(i−1,j)−X(i+1,j))
$H_B = \Sigma_{i=1,2} \Sigma_{j=1,2}$ H(i,j)
$V_B = \Sigma_{i=1,2} \Sigma_{j=1,2}$ V(i,j)
Direction=0,1(H>k1*V),2(V>k2*H)
Activity Metric
$L_B = H_B + V_B$
5 classes(0,1,2,3,4)
Metric
Combination of Activity and Direction (e.g. 15 or 16 combinations as explained above in the example of FIG. 4B)

Figure 5B:
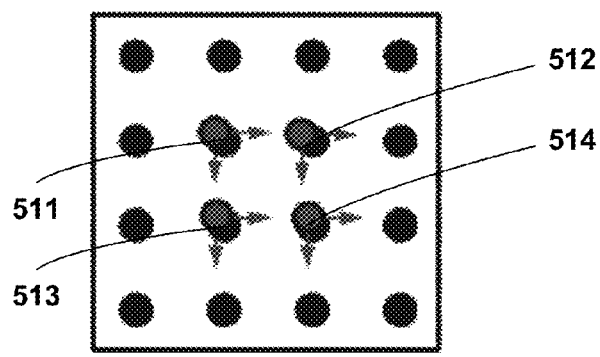
Figure 5C:
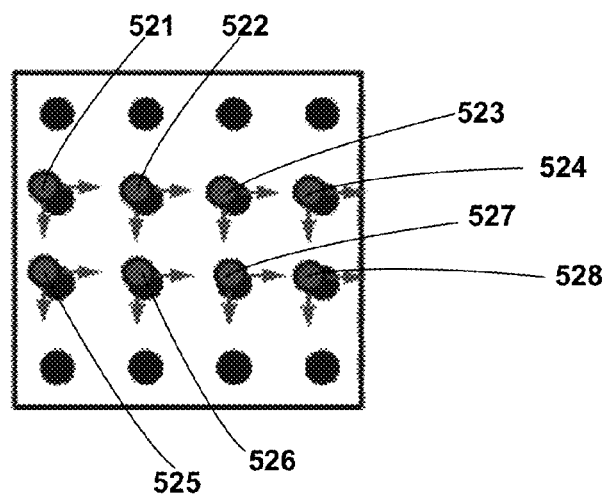

This different subset of pixels for calculating $H_B$ and $V_B$ includes pixels (1, 1), (2, 1), (1, 2), and (2, 2), shown on FIG. 5B as pixels 511, 512, 513, and 514, respectively. As can be seen by FIG. 5B, all of the upper neighboring pixels, lower neighboring pixels, right neighboring pixels, and left neighboring pixels for pixels 511, 512, 513, and 514 are located within the 4×4 block. In the example of FIG. 5B, pixels 511,512, 513, and 514 are all located in the interior of the block as opposed to be locating on the block boundary. Pixels 501, 502, 503, and 505 in FIG. 5A and pixels 521, 524, 525, and 528 in FIG. 5C are examples of pixels located on the block boundary. In other implementations, additional different subsets of pixel may be chosen. For example, subsets may be selected such that upper and lower neighboring pixels for the pixels of the subset are within the 4×4 block, but some left and right neighboring pixels are in neighboring blocks. Subsets may also be selected such that left and right neighboring pixels for the pixels of the subset are within the 4×4 block, but some upper and lower neighboring pixels are in neighboring blocks.

Generally using the same techniques described above, a block activity metric may also be calculated using a subset of eight pixels as follows:
Direction Metric
Ver_act(i,j)=abs(X(i,j)<<1−X(i,j−1)−X(i,j+1))
Hor_act(i,j)=abs(X(i,j)<<1−X(i−1,j)−X(i+1,j))
$H_B = \Sigma_{i=0,1,2,3} \Sigma_{j=1,2}$ H(i,j)
$V_B = \Sigma_{i=0,1,2,3} \Sigma_{j=1,2}$ V(i,j)
Direction=0,1(H>k1*V), 2(V>k2*H)
Activity Metric
$L_B = H_B + V_B$
5 classes(0,1,2,3,4)
Metric
Combination of Activity and Direction (e.g. 15 or 16 combinations as explained above in the example of FIG. 4B)

This different subset of eight pixels for calculating $H_B$ and $V_B$ includes pixels (0, 1), (1, 1), (2, 1), (3, 1), (0, 2), (1, 2), (2, 2), and (3, 2), shown on FIG. 5C as pixels 521, 522, 523, 524, 525, 526, 527, and 528 respectively. As can be seen by FIG. 5C, all of the upper neighboring pixels and lower neighboring pixels for pixels 621, 622, 623, and 624, 625, 626, 627, and 628 are located within the 4×4 block, although pixels 621 and 625 each have left neighboring pixels in a left neighboring block and pixels 624 and 628 each have right neighboring pixels in a right neighboring block. This particular selection of pixels may reduce encoder and/or decoder complexity by avoiding the need for a line buffer for storing pixel values of upper and/or lower neighboring blocks. Due to the left-to-right, top-to-bottom raster scan order, line buffers for pixel values of upper and lower neighboring blocks often need to store pixel values for the entire upper or lower line, which in the case of 1080P video, for example, might be 1920 pixels. Line buffers for, left and right neighboring blocks, however, often only need to store pixel values for one LCU or a couple of LCUs, which might only be 64 or 128 pixels, for example. Thus, line buffers for pixel values of upper and lower neighboring blocks may need to be significantly larger than line buffers used for pixel values of left and right neighboring blocks. The selection of pixels shown in FIG. 5C may be able to avoid the use of line buffers for pixel values of upper and lower neighboring block, thus reducing coding complexity.

The examples of FIGS. 5A-5C are merely introduced to illustrate techniques of this disclosure. It is contemplated that these techniques can be extended to blocks other than just 4×4 and that different subsets of pixels may be selected.

When computing a block activity metric, instead of original pixels, quantized pixels (i.e., X(i,j)>>N) can be used to reduce the complexity of operations, such as addition operations. Additionally, calculations can be absolute difference based instead of Laplacian based. For example, when computing Hor_act(i,j) or Ver_act(i,j), absolute differences can be used instead of Laplacian values, as follows:
Direction Metric
Ver_act(i,j)=abs(X(i,j)−X(i,j−1))
Hor_act(i,j)=abs(X(i,j)−X(i−1,j))
$H_B = \Sigma_{i=0,1,2} \Sigma_{j=0,1,2}$ H(i,j)
$V_B = \Sigma_{i=0,1,2} \Sigma_{j=0,1,2}$ V(i,j)
Direction=0,1(H>2V),2(V>2H)

Activity Metric
$L_B = H_B + V_B$
5 classes(0,1,2,3,4)
Metric
Activity+Direction (e.g. 15 or 16 combinations as explained above in the example of FIG. 4B)

This disclosure has described sub-sampling techniques with reference to a limited group of specific metrics. It is contemplated, however, that these sub-sampling techniques are generally applicable to other metrics, such as the other metrics discussed in this disclosure, that may be used for purposes of determining a filter. Additionally, although the sub-sampling techniques of this disclosure have been described with reference to 4×4 blocks of pixels, the techniques may also be applicable to blocks of other sizes.

In addition to determining a filter using the BA mode described above, ALF 65 may also determine a filter using an RA mode. In the RA mode, ALF 65 classifies the whole frame into a number of regions (i.e., R(i,j) with I=0, . . . M and j=0, . . . , N), and each region can have one filter. For each CU, ALF 65 can choose whether to use the ALF filter or not.

FIG. 6A is a conceptual diagram showing 16 rectangular regions (i.e., R(i,j) with i,j=0, . . . , 3 in FIG. 6) for picture 610B. Each of regions R(i,j) can have an associated filter, with some regions being associated with the same filter. For example, all 16 regions of picture 610A do not necessarily have a unique filter. As one example, R(0,1), R(0,2), R(1,1), and R(1,2) may all be associated with the same filter. For each CU, ALF 65 can choose whether or not to apply the filter associated with the region of the CU. According to the techniques of this disclosure, the regions for a particular picture can be adaptively determined by ALF unit 65 and signaled in the encoded video bitstream to video decoder 30.

FIG. 6B is a conceptual diagram showing 12 rectangular regions for picture 610B. ALF unit 65 may, for example, determine that for a particular picture 12 regions produces a more desired rate-distortion tradeoff than the 16 regions shown in FIG. 6A. Accordingly, ALF unit 65 may include in the encoded bitstream an indication of how picture 610B is to be divided into regions for an RA mode. The indication may, for example, include a number of regions in the horizontal direction and a number of regions in the vertical direction, a total number of regions to be used, or may include a size for the regions. If the indication is a total number of regions, then video encoder 20 and video decoder 30 can be configured to interpret the total number of regions in the same manner. For example, video encoder 20 and video decoder 30 may both be configured to interpret 12 regions as meaning 4 regions across and 3 regions down, as opposed to 3 regions across and 4 regions down, 6 regions across and 2 regions down or some other configuration. As will be apparent, numerous different algorithms for converting a total number of regions into a number of horizontal regions and vertical regions may be used as long as video encoder 20 and video decoder 30 are configured to implement the same algorithm.

According to the techniques of this disclosure, video encoder 30 can signal a number of filters (L) as part of a parameter set (PS) associated with a group of LCUs. The various parameter set (PS) options described below may be dynamically selected such that one sequence of video frames uses one PS option while another sequence of video frames, i.e., pictures, uses a different PS option. In such a configuration, the selected PS option may be, in some configurations, explicitly signaled from video encoder 20 to video decoder 30 as part of a parameter set while in other configurations the selection may be made based on context information and without explicit signaling. Alternatively, in some implementations, only one of the PS options may be selected, as part of a coding standard for example, such that all transmitted parameter sets correspond to one PS option. The techniques of this disclosure may be implemented with only a subset of the PS options shown below and/or may be implemented with additional PS options now shown below.

PS Option 1: transmit information for constructing L filters using BA classification as described above (e.g. classify each 4×4 block into one of 16 classes based on metrics)
For each BA class, derive one filter ($f_{BA\_}i$ with i=0, . . . , L−1 where L≤16)
Stored in the filter buffer as index 0, meaning if index 0 is transmitted for a particular LCU, then a filter for the 4×4 blocks of that LCU is to be determined based on the BA class determined for the 4×4 block.

PS Option 2: transmit information for constructing L filters with fixed RA classification (e.g. 16 equally divided regions)
For each region, derive one filter ($f_{RA\_}i$ with i=0, . . . , L−1 where L≤16)
Stored in the filter buffer as index 0, meaning if index 0 is transmitted for a particular LCU, then filters for the CUs of the LCU are to be determined based on an RA classification of the CU.

PS Option 3: transmit information for constructing L filters with modified RA classification (sub-groups of M×N LCUs, i.e. M×N LCU-based regions)
For each M×N LCUs, derive one filter ($f_{RAnew\_}i$ with i=0, . . . , L−1). In some instances, more than one sub group of LCUs may map to the same filter.
The filters can be mapped to index 0 in a buffer filter index, where filter index 0 indicates the filter to be used is selected based on a sub-group or region containing the LCU. For example, in a parameter set, a filter associated with a sub grouping of LCUs can be transmitted from encoder to decoder. As with PS Option 2 described above, a filter index of 0 indicates that for a particular LCU, the filter associated with that LCU's sub-grouping or LCU is to be used.
Either the size of the sub-groups (e.g. values for M and N) or number of regions can be signaled from encoder 20 to decoder 30. If a number of regions is transmitted from encoder to decoder, the encoder and decoder can be configured to implement the regions in the same manner, such that additional syntax does not need to be transmitted from encoder to decoder. For example, if an encoder signals eight regions, both the encoder and decoder can be configured to recognize that eight regions corresponds to two rows of four regions, as opposed to one row of eight regions.
Filters of different regions can be merged and the mapping between filters and regions can be signaled.

PS Option 4: transmit information for constructing L filters without classification
Derive L filters (i.e., using) ($f_{NC\_}i$ with i=0, . . . , L−1) explicitly signal a filter for each LCU as opposed to determining filters metrics or location.
The L filters can be stored in the filter buffer as index 0 to L−1.

In the various PS options described above, "transmit information" generally means signaling such information in an encoded bitstream.

For each LCU, a filter can be selected based on the following LCU options. As will be made clear by the description below, the meaning and implementation for a particular LCU option may be dependent on the PS Option signaled above. In general, the option selected for a particular LCU can be signaled in the bitstream. In some implementations, the option may be signaled as part of a codeword that also includes other information such as a filter index of a filter.

- LCU option 1: A filter is selected from the set of filters transmitted in the parameter set or filters added to the set of filters via LCU option 2 described below. The filter from the set of filters may be identified based on an index value that is also signaled in conjunction with LCU option 1.
  - If PS Option 1 and an index of 0: choose an ALF filters based on BA techniques described above.
  - If PS Option 1 and an index other than 0: apply the filter associated with the index other than 0.
  - If PS Option 2 and an index of 0: choose an ALF filter based on the RA techniques described above.
  - If PS Option 2 and an index other than 0: apply the filter associated with the index other than 0.
  - If PS Option 3 with index of 0: choose an ALF filter based on the modified RA techniques described above.
  - If PS Option 3 with index other than 0: apply the filter associated with the index other than 0
  - If PS Option 4: for each LCU, apply one filter out of L filters (signal index 0 to (L−1) for filters transmitted in parameter set or filter index of L, L+1, L+2, etc. for new filters received via LCU option 2 described below)
- LCU option 2: Receive a new filter for an LCU. The new filter can be a filter not originally included in the parameter set.
  - The new filter can be stored in a filter buffer and assigned an index so that the filter can be used by subsequent LCUs. If, for example, implementing PS Option 1, a new filter can be stored to index 1, where index 0 indicates the filter associated with a BA classification. If for example, implementing PS option 2 or 3, a new filter can be stored to index 1, where index 0 indicates the filter associated with a RA classification. If, for example, implementing, PS Option 4, the new filter can be assigned index L, where the filters transmitted in the parameter set are indexed to 0 through L−1.
- LCU option 3: signal information indicating a filter to be used for a current LCU is the same as a filter used for a previously coded LCU. For example, merge information (i.e., merge_left or merge_up) can be signaled from encoder 20 to decoder 30. When LCU option 3 is signaled, a merge_left flag may, for example, indicate an LCU is to use the same filter as the LCU to its left, or a merge_up flag may indicate the LCU is to use the same filter as the LCU above.
- LCU option 4: Filter Off, meaning if LCU option 4 is signaled for an LCU, then no filtering is applied to the LCU.

According to the techniques of this disclosure, a video coder (e.g. video encoder 20 or video decoder 30) can implement all or a subset of the different LCU options described above. Additionally, a video coder may also implement additional LCU options not described in this disclosure. As described above ALF unit 65 can test multiple ALF filtering scenarios and determine which of the filtering scenarios provides a desirable rate-distortion tradeoff. Video encoder 20 can signal the determined ALF filtering scenario using the signaling techniques described above. Video encoder 20 may, for example, signal one of the four PS options described above in a parameter set. As described above, in addition to signaling the selected PS option, video encoder 20 may also signal information for constructing a set of filters and for mapping those filters to different classifications such as the BA and RA classifications described above.

For LCUs, video encoder 20 may signal one of the LCU options described above. As explained above, the implementation of a particular LCU option may vary depending on the signaled PS option. Additionally as described above, when signaling a particular LCU option, video encoder 20 may also signal additional information. For example, with LCU option 1, video encoder 20 may signal an index identifying a filter to be applied, while with LCU option 2, video encoder 20 may signal a new filter. In some instances, the LCU option and the additional information may be signaled as part of a single codeword.

In this manner, video encoder 20 of FIG. 3 represents an example of a video encoder configured to generate for inclusion, in a parameter set for a group of largest coding units (LCUs), information for constructing a set of filters for an adaptive loop filter (ALF) operation; determine how to divide the group of LCUs into sub-groups of LCUs; determine for each sub-group of LCUs, an associated filter from the set of filters; determine a filter for a first LCU, wherein the first LCU is from a first sub-group of LCUs, wherein the filter for the first LCU corresponds to a filter associated with the first sub-group of LCUs; generate, for inclusion in the parameter set, an indication of how to divide the group of LCUs into the sub-groups of LCUs; and, generate, for inclusion in an encoded bitstream, an indication that indicates that the first LCU is to be filtered using the filter associated with the first sub-group of LCUs.

In this manner, video encoder 20 of FIG. 3 also represents an example of a video encoder configured to generate for inclusion, in a parameter set for a group of largest coding units (LCUs), information for constructing a set of filters for an adaptive loop filter (ALF) operation; determine for each filter in the set of filters an associated filter index; determine for a first LCU a filter from the set of filters; generate, for inclusion in an encoded bitstream, an indication that indicates that a first LCU is to be filtered using the ALF operation; and generate, for inclusion in an encoded bitstream, a filter index identifying a filter from the set of filters that is to be used for filtering the first LCU.

Figure 7:
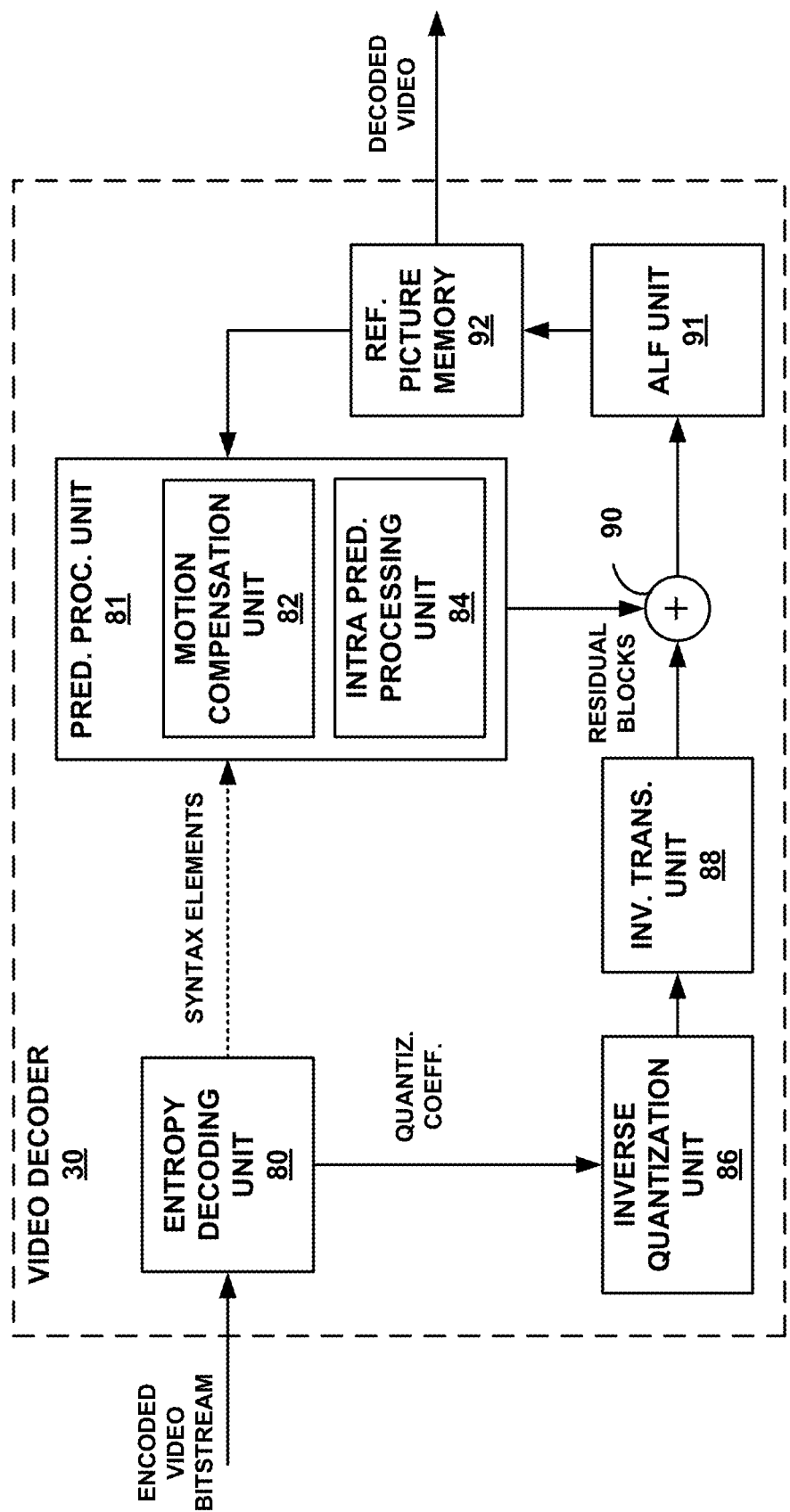
FIG. 7 is a block diagram illustrating an example video decoder that may implement the techniques described in this disclosure.

FIG. 7 is a block diagram illustrating an example video decoder 30 that may implement the techniques described in this disclosure. In the example of FIG. 7, video decoder 30 includes an entropy decoding unit 80, prediction processing unit 81, inverse quantization unit 86, inverse transformation unit 88, summer 90, adaptive loop filter (ALF) unit 91, and reference picture memory 92. Prediction processing unit 81 includes motion compensation unit 82 and intra prediction processing unit 84. Video decoder 30 may, in some examples, perform a decoding pass generally reciprocal to the encoding pass described with respect to video encoder 20 from FIG. 3. ALF unit 91 can be configured to perform the adaptive loop filtering techniques described above.

During the decoding process, video decoder 30 receives an encoded video bitstream that represents video blocks of an encoded video slice and associated syntax elements from video encoder 20. Entropy decoding unit 80 of video decoder 30 entropy decodes the bitstream to generate quantized coefficients, motion vectors, and other syntax elements. Entropy decoding unit 80 forwards the motion vectors and other syntax elements to prediction processing unit 81. Video decoder 30 may receive the syntax elements at the video slice level and/or the video block level.

When the video slice is coded as an intra-coded (I) slice, intra prediction processing unit 84 of prediction processing unit 81 may generate prediction data for a video block of the current video slice based on a signaled intra prediction mode and data from previously decoded blocks of the current frame or picture. When the video frame is coded as an inter-coded (i.e., B, P or GPB) slice, motion compensation unit 82 of prediction processing unit 81 produces predictive blocks for a video block of the current video slice based on the motion vectors and other syntax elements received from entropy decoding unit 80. The predictive blocks may be produced from one of the reference pictures within one of the reference picture lists. Video decoder 30 may construct the reference frame lists, List 0 and list 1, using default construction techniques based on reference pictures stored in reference picture memory 92, which may also be referred to as a decoded picture buffer (DPB).

Motion compensation unit 82 determines prediction information for a video block of the current video slice by parsing the motion vectors and other syntax elements, and uses the prediction information to produce the predictive blocks for the current video block being decoded. For example, motion compensation unit 82 uses some of the received syntax elements to determine a prediction mode (e.g., intra- or inter-prediction) used to code the video blocks of the video slice, an inter-prediction slice type (e.g., B slice, P slice, or GPB slice), construction information for one or more of the reference picture lists for the slice, motion vectors for each inter-encoded video block of the slice, inter-prediction status for each inter-coded video block of the slice, and other information to decode the video blocks in the current video slice.

Motion compensation unit 82 may also perform interpolation based on interpolation filters. Motion compensation unit 82 may use interpolation filters as used by video encoder 20 during encoding of the video blocks to calculate interpolated values for sub-integer pixels of reference blocks. In this case, motion compensation unit 82 may determine the interpolation filters used by video encoder 20 from the received syntax elements and use the interpolation filters to produce predictive blocks.

Inverse quantization unit 86 inverse quantizes, i.e., dequantizes, the quantized transform coefficients provided in the bitstream and decoded by entropy decoding unit 80. The inverse quantization process may include use of a quantization parameter calculated by video encoder 20 for each video block in the video slice to determine a degree of quantization and, likewise, a degree of inverse quantization that should be applied. Inverse transform processing unit 88 applies an inverse transform, e.g., an inverse DCT, an inverse integer transform, or a conceptually similar inverse transform process, to the transform coefficients in order to produce residual blocks in the pixel domain.

After motion compensation unit 82 generates the predictive block for the current video block based on the motion vectors and other syntax elements, video decoder 30 forms a decoded video block by summing the residual blocks from inverse transform processing unit 88 with the corresponding predictive blocks generated by motion compensation unit 82. Summer 90 represents the component or components that perform this summation operation. If desired, a deblocking filter may also be applied to filter the decoded blocks in order to remove blockiness artifacts. Other loop filters (either in the coding loop or after the coding loop) in addition to a deblocking filter and ALF 91 may also be used to smooth pixel transitions, or otherwise improve the video quality. The decoded video blocks in a given frame or picture are then stored in reference picture memory 92, which stores reference pictures used for subsequent motion compensation. Reference picture memory 92 also stores decoded video for later presentation on a display device, such as display device 32 of FIG. 1.

ALF unit 91 may generally be configured to perform the same filtering techniques as described above with respect to ALF unit 65 of FIG. 3. ALF unit 65, however, may be configured to code a portion of video data using several different ALF coding scenarios and choose the coding scenario (i.e. choose the filter) that produces a desired rate-distortion tradeoff and generate syntax elements, including a PS option and LCU option, to indicate the chosen filter. ALF unit 91, in contrast, does not test multiple coding scenarios, but instead, applies the coding scenario indicated by received syntax elements. Video decoder 30 may, for example, receive an indication of a PS option and an LCU option as described above as well as receive additional information enable ALF unit 91 to construct a set of filters. Depending on the LCU option selected for a particular LCU, video decoder 30 may also receive an index identifying a particular filter to be applied.

In this manner, video decoder 30 of FIG. 7 represents an example of a video decoder configured to receive, in a parameter set for a group of largest coding units (LCUs), information for constructing a set of filters for an adaptive loop filter (ALF) operation; receive, in the parameter set, an indication of how to divide the group of LCUs into sub-groups of LCUs; assigning each of the sub-groups of LCUs to a filter from the set of filters; receive an indication that indicates that a first LCU is to be filtered using the ALF operation, wherein the first LCU is in a first sub-group of LCUs; determine a filter for the first LCU based on the indication that the first LCU is to be fileted by the ALF and based on the indication of how to divide the group of LCUs into the sub-group of LCUs, wherein the filter for the first LCU corresponds to a filter assigned to the first sub-group of LCUs; and, filter a coded unit of the LCU using the filter for the first LCU.

In this manner, video decoder 30 of FIG. 7 represents an example of a video decoder configured to receive, in a parameter set for a group of largest coding units (LCUs), information for constructing a set of filters for an adaptive loop filter (ALF) operation; determine for each filter in the set of filters an associated filter index; receive an indication that indicates that a first LCU is to be filtered using the ALF operation; and receive a filter index identifying a filter from the set of filters that is to be used for filtering the first LCU; and filter one or more coded unit (CUs) of the LCU using the filter from the set of filters.

Figure 8:
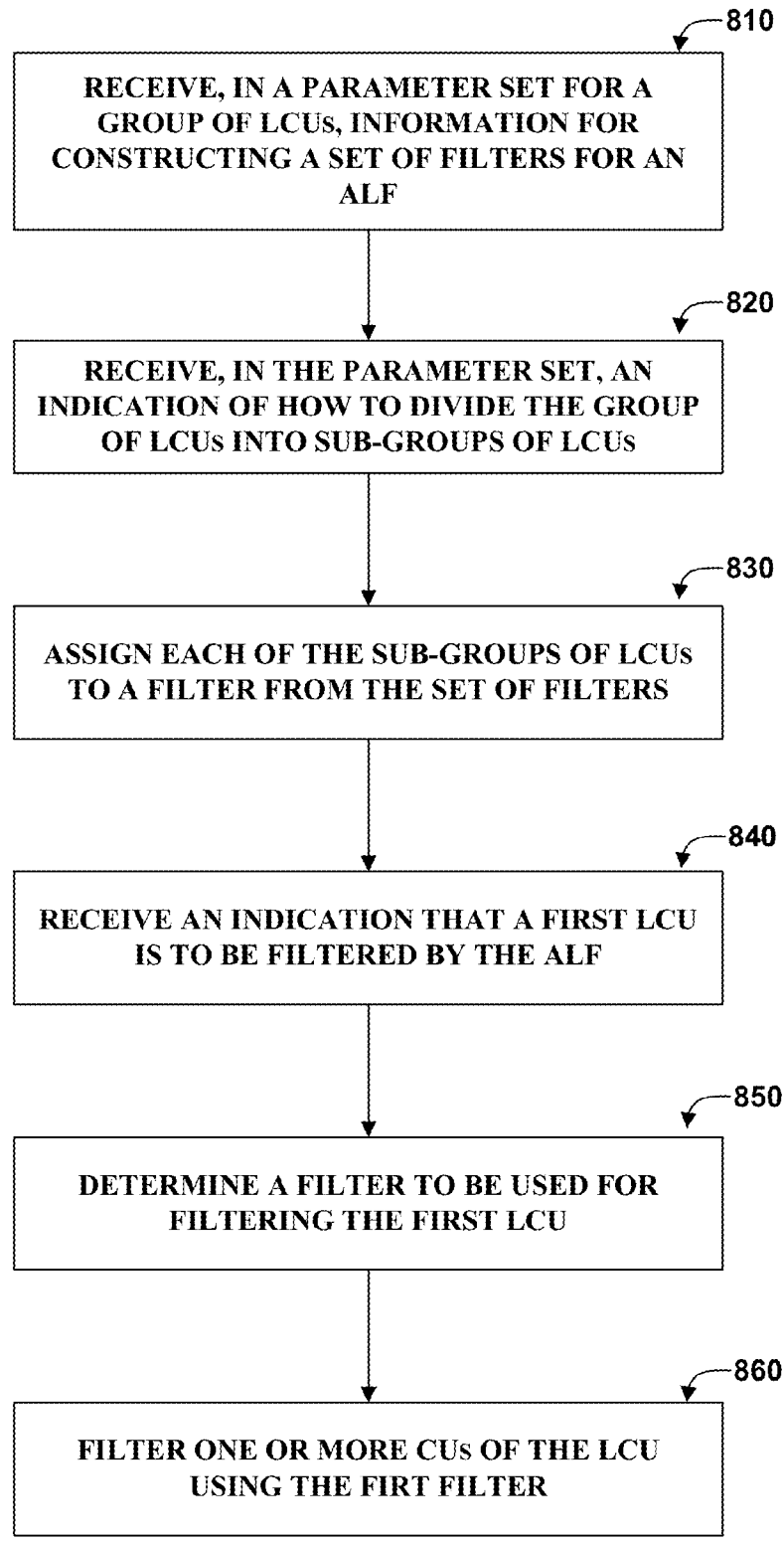
FIG. 8 is a flow diagram illustrating coding techniques consistent with this disclosure.

FIG. 8 is a flowchart illustrating an example video decoding technique in accordance with the techniques of this disclosure. The techniques of FIG. 8 will be described with reference to video decoder 30 of FIGS. 1 and 7, although other types of video decoders may also implement the techniques described. Video decoder 30 receives, in a parameter set for a group of LCUs, information for constructing a set of filters for an ALF (810). Video decoder 30 receives, in the parameter set, an indication of how to divide the group of LCUs into sub-groups of LCUs (820). This indication of how to divide LCUs may, in some instances, be sent in conjunction with an indication that PS option 3, as described above, is to be used for a particular group of LCUs. Video decoder 30 assigns each of the sub-groups of LCUs to a filter from the set of filters (830). Video decoder 30 receives an indication that a first LCU is to be filtered using the ALF operation (840). This indication may, for example, be an LCU-level indication, such as LCU option 1, 2, or 3 described above. Video decoder 30 determines a filter to be used for filtering the first LCU (850). Video decoder 30 may, for example, determine the filter according to any of LCU options 1, 2, or 3 described above. Video decoder 30 may then filter one or more CUs of the LCU using the determined filter (860).

Figure 9:
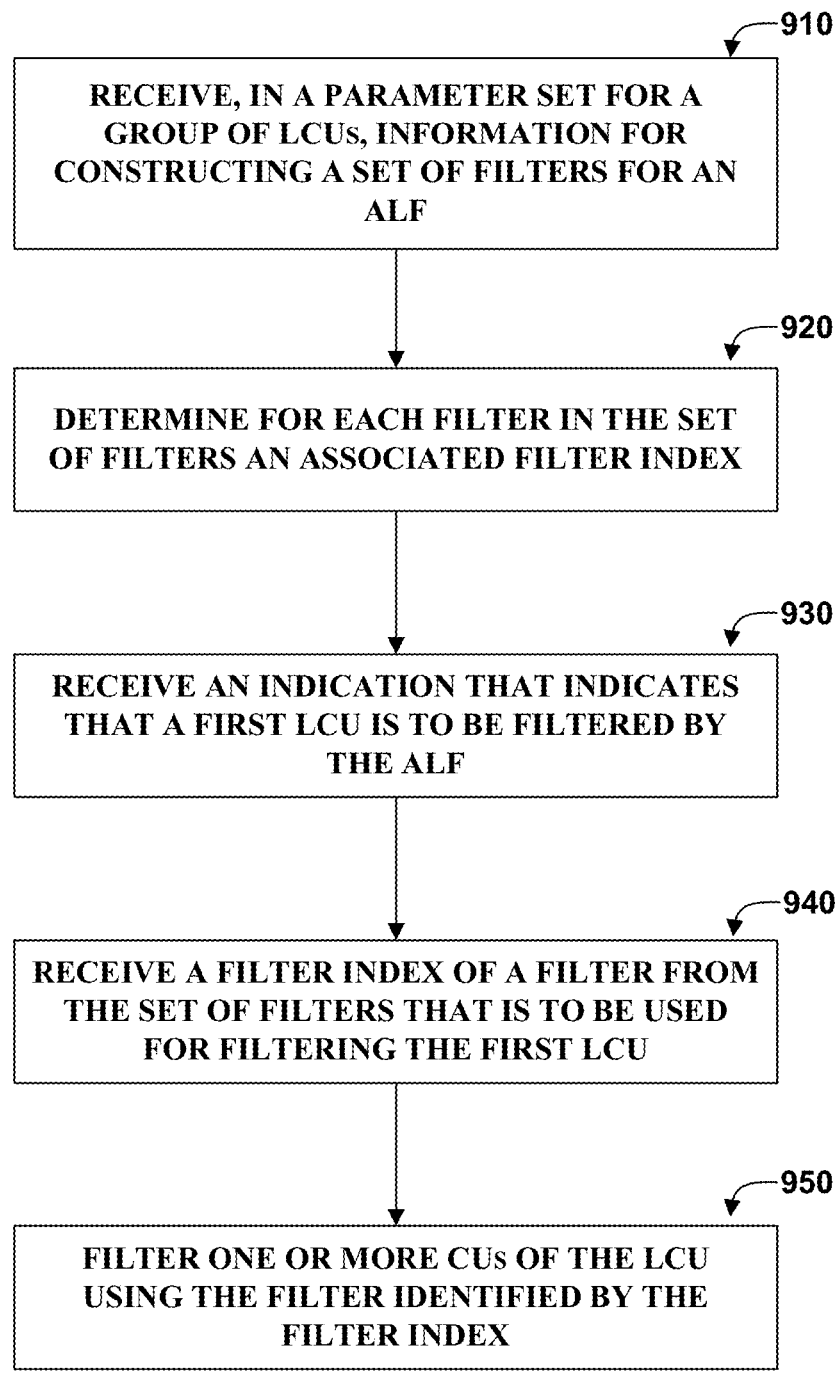
FIG. 9 is a flow diagram illustrating coding techniques consistent with this disclosure.

FIG. 9 is a flowchart illustrating an example video decoding technique in accordance with the techniques of this disclosure. The techniques of FIG. 9 will be described with reference to video decoder 30 of FIGS. 1 and 7, although other types of video decoders may also implement the techniques described. Video decoder 30 receives, in a parameter set for a group of LCUs, information for constructing a set of filters for an ALF (910). Video decoder 30 may, for example, receive the information for constructing the set of filters in conjunction with receiving in a parameter set an indication that a group of LCUs are to be filtered in accordance with PS option 4 above. Video decoder 30 determines for each filter in the set of filters an associated filter index (920). Video decoder 30 receives an indication that indicates that a first LCU is to be filtered by the ALF (930). This indication may, for example, be an LCU-level indication, such as LCU option 1 described above. When the first LCU is to be filtered, video decoder 30 receives a filter index of a filter from the set of filters that is to be used for filtering the first LCU (940). Video decoder 30 may then filter a CU of the LCU using the filter identified by the filter index (950).

Figure 10:
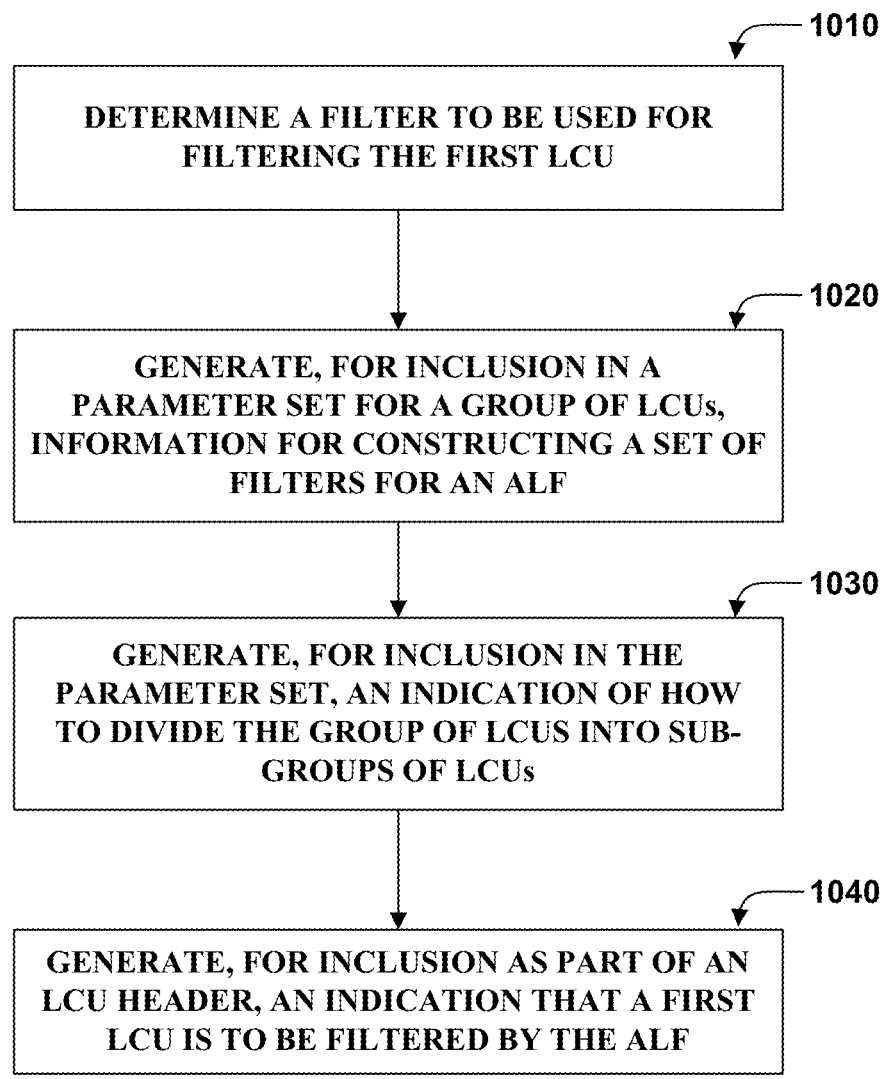
FIG. 10 is a flow diagram illustrating coding techniques consistent with this disclosure.

FIG. 10 is a flowchart illustrating an example video encoding technique in accordance with the techniques of this disclosure. The techniques of FIG. 10 will be described with reference to video encoder 20 of FIGS. 1 and 3, although other types of video encoders may also implement the techniques described. Video encoder 20 determines a filter to be used for filtering the first LCU (1010). The first LCU is an LCU that is part of a group of LCUs. Video encoder 20 generates, for inclusion in a parameter set for a group of LCUs, information for constructing a set of filters for an ALF (1020). The set of filters includes the filter determined to be used for filtering the first LCU. Video encoder 20 generates, for inclusion in the parameter set, an indication of how to divide the group of LCUs into sub-groups of LCUs (1030). Video encoder 20 may in some instances signal this indication of how to divide LCUs in conjunction with an indication that PS option 3, as described above, is to be used for a particular group of LCUs. Video encoder 20 may generate, for inclusion as part of an LCU header, an indication that a first LCU is to be filtered by the ALF (1040). This indication may, for example, be an LCU-level indication, such as LCU option 1, 2, or 3 described above. Video encoder 20 may also apply the filter to a CU of the LCU and store a filtered picture in reference picture memory 64.

Figure 11:
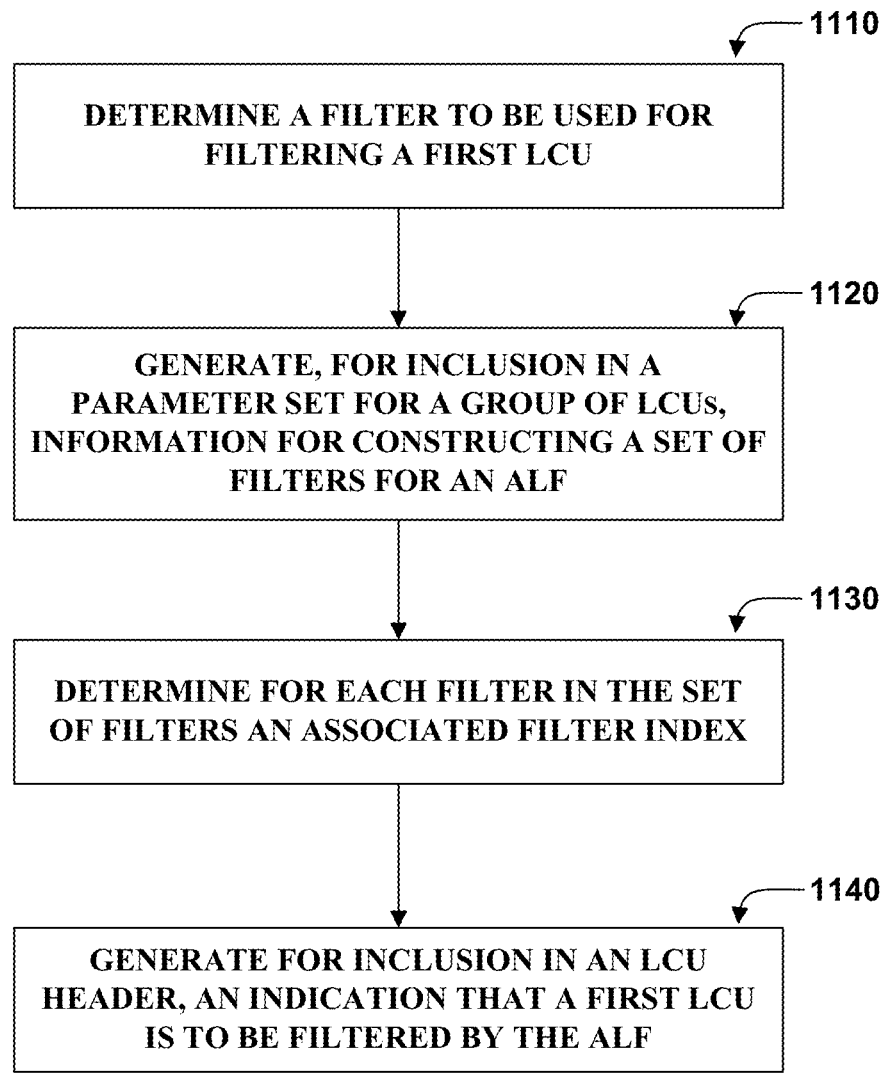
FIG. 11 is a flow diagram illustrating coding techniques consistent with this disclosure.

FIG. 11 is a flowchart illustrating an example video encoding technique in accordance with the techniques of this disclosure. The techniques of FIG. 11 will be described with reference to video encoder 20 of FIGS. 1 and 3, although other types of video encoders may also implement the techniques described. Video encoder 20 determines that is to be used for filtering a first LCU (1110). Video decoder 30 generates, for inclusion in a parameter set for a group of LCUs, information for constructing a set of filters for an ALF (1120). The determined filter is one of the filters in the set of filters. Video encoder 20 may, for example, generate information for constructing the set of filters in conjunction with generating, for inclusion in a parameter set, an indication that a group of LCUs are to be filtered in accordance with PS option 4 above. Video encoder 20 may determine for each filter in the set of filters an associated filter index (1130). Video decoder 30 may, generate for inclusion in an LCU header, an indication that a first LCU is to be filtered by the ALF (1140). This indication may, for example, be an LCU-level indication, such as LCU option 1 described above. Video encoder 20 may also apply the filter to a CU of the LCU and store a filtered picture in reference picture memory 64.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method for decoding video data, the method comprising:
   receiving, in a parameter set for a group of largest coding units (LCUs), information for constructing a set of filters for an adaptive loop filter (ALF) operation, wherein each filter in the set of filters comprises a set of filter coefficients;
   receiving, in the parameter set, an indication of how to divide the group of LCUs into sub-groups of LCUs;
   assigning each of the sub-groups of LCUs to a filter from the set of filters;
   receiving a first indication that indicates that a first LCU is to be filtered using a first filter, wherein the first LCU is in a first sub-group of LCUs,
   wherein the first filter for the first LCU corresponds to a filter assigned to the first sub-group of LCUs;
   filtering one or more coded units (CUs) of the first LCU using the filter for the first LCU;
   receiving a second indication that indicates that a second LCU is to be filtered using a second filter, wherein the second LCU is in the first sub-group of LCUs, wherein the second filter is a filter other than the filter assigned to the first sub-group of LCUs; and
   filtering one or more CUs of the second LCU using the second filter.

2. The method of claim 1, wherein the indication of how to divide the group of LCUs into sub-groups of LCUs indicates how many sub-groups of LCUs are in the group of LCUs.

3. The method of claim 1, wherein the indication of how to divide the group of LCUs into sub-groups of LCUs indicates how many rows of sub-groups of LCUs are in the group of LCUs and how many columns of sub-groups of LCUs are in the group of LCUs.

4. The method of claim 1, wherein the indication of how to divide the group of LCUs into sub-groups of LCUs comprises a size for a sub-group of LCUs.

5. The method of claim 1, wherein the second filter comprises a new filter.

6. The method of claim 5, further comprising:
   receiving information for constructing the new filter.

7. The method of claim 6, further comprising:
   receiving a filter indication for a third LCU, wherein the filter indication for the third LCU signals the new filter is to be used for filtering the third LCU.

8. The method of claim 1, wherein the second filter comprises a filter used for filtering a previously coded LCU.

9. The method of claim 1, further comprising:
   receiving an indication for a third LCU that the third LCU is not to be filtered.

10. A method for decoding video data, the method comprising:
    receiving, in a parameter set for a picture, information for constructing a set of two or more filters for an adaptive loop filter (ALF) operation;
    determining for each filter in the set of two or more filters an associated filter index;
    receiving an indication that indicates that a first largest coding unit (LCU) is to be filtered using the ALF operation;
    receiving a filter index identifying a filter from the set of two or more filters that is to be used for filtering the first LCU;
    filtering one or more coded unit (CUs) of the LCU using the filter from the set of two or more filters;
    for a second LCU, receiving an indication that a filter to be used for filtering the second LCU is a new filter not originally in the set of two or more filters in the parameter set;
    receiving information for constructing the new filter; and
    filtering one or more CU s of the second LCU using the new filter.

11. The method of claim 10, further comprising:
    assigning the new filter to a new associated filter index; and
    receiving for a third LCU an indication that the new filter is to be used for filtering the third LCU.

12. The method of claim 10, further comprising:
    for a third LCU, receiving an indication that a filter to be used for filtering the third LCU is a filter used for filtering a previously coded LCU; and
    filtering the third LCU using the filter used for filtering the previously coded LCU.

13. The method of claim 10, further comprising:
    receiving an indication for a third LCU that the third LCU is not to be filtered.

14. A method for encoding video data, the method comprising:
    generating for inclusion, in a parameter set for a group of largest coding units (LCUs), information for constructing a set of filters for an adaptive loop filter (ALF) operation, wherein each filter in the set of filters comprises a set of filter coefficients;
    determining how to divide the group of LCUs into sub-groups of LCUs;
    determining for each sub-group of LCUs, an assigned filter from the set of filters;
    determining a first filter for a first LCU, wherein the first LCU is from a first sub-group of LCUs, wherein the first filter for the first LCU corresponds to a filter assigned to the first sub-group of LCUs;
    determining a second filter for a second LCU, wherein the second LCU is from the first sub-group of LCUs, wherein the second filter is a filter other than the filter assigned to the first sub-group of LCUs;
    generating, for inclusion in the parameter set, an indication of how to divide the group of LCUs into the sub-groups of LCUs;
    generating, for inclusion in an encoded bitstream, an indication that indicates that the first LCU is to be filtered using the filter assigned to the first sub-group of LCUs; and generating, for inclusion in the encoded bitstream, an indication that indicates that the second LCU is to be filtered using the second filter.

15. The method of claim 14, wherein the indication of how to divide the group of LCUs into sub-groups of LCUs indicates how many sub-groups of LCUs are in the group of LCUs.

16. The method of claim 14, wherein the indication of how to divide the group of LCUs into sub-groups of LCUs indicates how many rows of sub-groups of LCUs are in the group of LCUs and how many columns of sub-groups of LCUs are in the group of LCUs.

17. The method of claim 14, wherein the indication of how to divide the group of LCUs into sub-groups of LCUs comprises a size for a sub-group of LCUs.

18. The method of claim 14, wherein the second filter comprises one of a new filter or a filter used for filtering a previously coded LCU.

19. A method for encoding video data, the method comprising:
generating for inclusion, in a parameter set for a picture, information for constructing a set of two or more filters for an adaptive loop filter (ALF) operation;
determining for each filter in the set of two or more filters an associated filter index;
determining for a first largest coding unit (LCU) a filter from the set of two or more filters;
generating, for inclusion in an encoded bitstream, an indication that indicates that the first LCU is to be filtered using the ALF operation;
generating, for inclusion in the encoded bitstream, a filter index identifying a filter from the set of two or more filters that is to be used for filtering the first LCU;
for a second LCU, generating, for inclusion in the encoded bitstream, an indication that a filter to be used for filtering the second LCU is a new filter not originally in the set of two or more filters in the parameter set; and
generating, for inclusion in the encoded bitstream, information for constructing the new filter.

20. The method of claim 19, further comprising:
for a third LCU, generating, for inclusion in the encoded bitstream, an indication that a filter to be used for filtering the third LCU is a filter used for filtering a previously coded LCU.

21. The method of claim 19, further comprising:
generating, for inclusion in the encoded bitstream, an indication for a third LCU that the third LCU is not to be filtered.

22. A device for coding video data, the device comprising:
a memory configured to store the video data; and
one or more processors configured to:
receive, in a parameter set for a group of largest coding units (LCUs), information for constructing a set of filters for an adaptive loop filter (ALF) operation, wherein each filter in the set of filters comprises a set of filter coefficients;
receive, in the parameter set, an indication of how to divide the group of LCUs into sub-groups of LCUs;
assign each of the sub-groups of LCUs to a filter from the set of filters;
receive a first indication that indicates that a first LCU is to be filtered using a first filter, wherein the first LCU is in a first sub-group of LCUs, wherein the first filter for the first LCU corresponds to a filter assigned to the first sub-group of LCUs;
filter one or more coded units (CUs) of the first LCU using the filter for the first LCU;
receive a second indication that indicates that a second LCU is to be filtered using a second filter, wherein the second LCU is in the first sub-group of LCUs, wherein the second filter is a filter other than the filter assigned to the first sub-group of LCUs; and
filter one or more CUs of the second LCU using the second filter.

23. The device of claim 22, wherein the indication of how to divide the group of LCUs into sub-groups of LCUs indicates how many sub-groups of LCUs are in the group of LCUs.

24. The device of claim 22, wherein the indication of how to divide the group of LCUs into sub-groups of LCUs indicates how many rows of sub-groups of LCUs are in the group of LCUs and how many columns of sub-groups of LCUs are in the group of LCUs.

25. The device of claim 22, wherein the indication of how to divide the group of LCUs into sub-groups of LCUs comprises a size for a sub-group of LCUs.

26. The device of claim 22, wherein the second LCU comprises a new filter.

27. The device of claim 26, wherein the one or more processors are further configured to receive information for constructing the new filter.

28. The device of claim 27, wherein the one or more processors are further configured to receive a filter indication for a third LCU, wherein the filter indication for the third LCU signals the new filter is to be used for filtering the third LCU.

29. The device of claim 22, wherein the second filter comprises a filter used for filtering a previously coded LCU.

30. The device of claim 22, wherein the one or more processors are further configured to receive an indication for a third LCU that the third LCU is not to be filtered.

31. The device of claim 22, wherein the device comprises at least one of:
an integrated circuit;
a microprocessor; or
a wireless communication device that comprises a video decoder.

32. A device for video coding, the device comprising:
a memory configured to store the video data; and
one or more processors configured to:
receive, in a parameter set for a picture, information for constructing a set of two or more filters for an adaptive loop filter (ALF) operation;
determine for each filter in the set of two or more filters an associated filter index;
receive an indication that indicates that a first largest coding unit (LCU) is to be filtered using the ALF operation;
receive a filter index identifying a filter from the set of two or more filters that is to be used for filtering the first LCU;
filter one or more coded unit (CUs) of the LCU using the filter from the set of two or more filters
for a second LCU, receive an indication that a filter to be used for filtering the second LCU is a new filter not originally in the set of two or more filters in the parameter set;
receive information for constructing the new filter; and
filter one or more CUs of the second LCU using the new filter.

33. The device of claim 32, wherein the one or more processors are further configured to assign the new filter to a new associated filter index; and receive for a third LCU and indication that the new filter is to be used for filtering the third LCU.

34. The device of claim 32, wherein the one or more processors are further configured to, for a third LCU, receiving an indication that a filter to be used for filtering the third LCU is a filter used for filtering a previously coded LCU; and filter the third LCU using the filter used for filtering the previously coded LCU.

35. The device of claim 32, wherein the one or more processors are further configured to receive an indication for a third LCU that the third LCU is not to be filtered.

36. The device of claim 32, wherein the device comprises at least one of:
an integrated circuit;
a microprocessor; or
a wireless communication device that comprises a video decoder.

37. A device for encoding video data, the device comprising:
a memory configured to store the video data; and
one or more processors configured to:
generate for inclusion, in a parameter set for a group of largest coding units (LCUs), information for constructing a set of filters for an adaptive loop filter (ALF) operation, wherein each filter in the set of filters comprises a set of filter coefficients;
determine how to divide the group of LCUs into sub-groups of LCUs;
determine for each sub-group of LCUs, an assigned filter from the set of filters;
determine a first filter for a first LCU, wherein the first LCU is from a first sub-group of LCUs, wherein the first filter for the first LCU corresponds to a filter assigned to the first sub-group of LCUs;
determine a second filter for a second LCU, wherein the second LCU is from the first sub-group of LCUs, wherein the second filter is a filter other than the filter assigned to the first sub-group of LCUs;
generate, for inclusion in the parameter set, an indication of how to divide the group of LCUs into the sub-groups of LCUs;
generate, for inclusion in an encoded bitstream, an indication that indicates that the first LCU is to be filtered using the filter assigned to the first sub-group of LCUs; and
generate, for inclusion in the encoded bitstream, an indication that indicates that the second LCU is to be filtered using the second filter.

38. The device of claim 37, wherein the indication of how to divide the group of LCUs into sub-groups of LCUs indicates how many sub-groups of LCUs are in the group of LCUs.

39. The device of claim 37, wherein the indication of how to divide the group of LCUs into sub-groups of LCUs indicates how many rows of sub-groups of LCUs are in the group of LCUs and how many columns of sub-groups of LCUs are in the group of LCUs.

40. The device of claim 37, wherein the indication of how to divide the group of LCUs into sub-groups of LCUs comprises a size for a sub-group of LCUs.

41. The device of claim 37, wherein determining the filter for the first LCU comprises receiving an indication that the filter to be used for filtering the first LCU is a filter indexed to the sub-group of LCUs comprising the first LCU.

42. The device of claim 37, wherein the device comprises at least one of:
an integrated circuit;
a microprocessor; or
a wireless communication device that comprises a video encoder.

43. A device for encoding video data, the device comprising:
a memory configured to store the video data; and
one or more processors configured to:
generate for inclusion, in a parameter set for a picture, information for constructing a set of two or more filters for an adaptive loop filter (ALF) operation;
determine for each filter in the set of two or more filters an associated filter index;
determine for a first largest coding unit (LCU) a filter from the set of two or more filters;
generate, for inclusion in an encoded bitstream, an indication that indicates that a first LCU is to be filtered using the ALF operation;
generate, for inclusion in the encoded bitstream, a filter index identifying a filter from the set of two or more filters that is to be used for filtering the first LCU;
for a second LCU, generate, for inclusion in the encoded bitstream, an indication that a filter to be used for filtering the second LCU is a new filter not originally in the set of two or more filters in the parameter set; and
generate, for inclusion in the encoded bitstream, information for constructing the new filter.

44. The device of claim 43, wherein the one or more processors are further configured to, for a third LCU, generate, for inclusion in the encoded bitstream, an indication that a filter to be used for filtering the third LCU is a filter used for filtering a previously coded LCU.

45. The device of claim 43, wherein the one or more processors are further configured to generate, for inclusion in the encoded bitstream, an indication for a third LCU that the third LCU is not to be filtered.

46. The device of claim 43, wherein the device comprises at least one of:
an integrated circuit;
a microprocessor; or
a wireless communication device that comprises a video encoder.

47. A device for decoding video data, the device comprising:
means for receiving, in a parameter set for a group of largest coding units (LCUs), information for constructing a set of filters for an adaptive loop filter (ALF) operation, wherein each filter in the set of filters comprises a set of filter coefficients;
means for receiving, in the parameter set, an indication of how to divide the group of LCUs into sub-groups of LCUs;
means for assigning each of the sub-groups of LCUs to a filter from the set of filters;
means for receiving a first indication that indicates that a first LCU is to be filtered using a first filter, wherein the first LCU is in a first sub-group of LCUs,
wherein the first filter for the first LCU corresponds to a filter assigned to the first sub-group of LCUs;
means for filtering one or more coded units (CUs) of the LCU using the filter for the first LCU;
means for receiving a second indication that indicates that a second LCU is to be filtered using a second filter, wherein the second LCU is in the first sub-group of LCUs, wherein the second filter is a filter other than the filter assigned to the first sub-group of LCUs; and means for filtering one or more CUs of the second LCU using the second filter.

48. A device for decoding video data, the device comprising:
- means for receiving, in a parameter set for a picture, information for constructing a set of two or more filters for an adaptive loop filter (ALF) operation;
- means for determining for each filter in the set of two or more filters an associated filter index;
- means for receiving an indication that indicates that a first largest coding unit (LCU) is to be filtered using the ALF operation; and
- means for receiving a filter index identifying a filter from the set of two or more filters that is to be used for filtering the first LCU;
- means for filtering one or more coded unit (CUs) of the LCU using the filter from the set of two or more filters;
- means for receiving an indication that a filter to be used for filtering a second LCU is a new filter not originally in the set of two or more filters in the parameter set;
- means for receiving information for constructing the new filter; and
- means for filtering one or more CU s of the second LCU using the new filter.

49. A non-transitory computer readable storage medium storing instructions that when executed cause one or more processors to:
- receive, in a parameter set for a group of largest coding units (LCUs), information for constructing a set of filters for an adaptive loop filter (ALF) operation, wherein each filter in the set of filters comprises a set of filter coefficients;
- receive, in the parameter set, an indication of how to divide the group of LCUs into sub-groups of LCUs;
- assign each of the sub-groups of LCUs to a filter from the set of filters;
- receive a first indication that indicates that a first LCU is to be filtered using a first filter, wherein the first LCU is in a first sub-group of LCUs, and wherein the first filter for the first LCU corresponds to a filter assigned to the first sub-group of LCUs;
- filter one or more coded units (CUs) of the first LCU using the filter for the first LCU;
- receive a second indication that indicates that a second LCU is to be filtered using a second filter, wherein the second LCU is in the first sub-group of LCUs, wherein the second filter is a filter other than the filter assigned to the first sub-group of LCUs; and
- filter one or more CUs of the second LCU using the second filter.

50. A non-transitory computer readable storage medium storing instructions that when executed cause one or more processors to
- receive, in a parameter set for a picture, information for constructing a set of two or more filters for an adaptive loop filter (ALF) operation;
- determine for each filter in the set of filters an associated filter index;
- receive an indication that indicates that a first largest coding unit (LCU) is to be filtered using the ALF operation; and
- receive a filter index identifying a filter from the set of filters that is to be used for filtering the first LCU;
- filter one or more coded unit (CUs) of the LCU using the filter from the set of filters;
- for a second LCU, receive an indication that a filter to be used for filtering the second LCU is a new filter not originally in the set of two or more filters in the parameter set;
- receive information for constructing the new filter; and
- filter one or more CU s of the second LCU using the new filter.

51. The device of claim 22, wherein the device comprises a wireless communication device, further comprising a receiver configured to receive encoded video data.

52. The device of claim 51, wherein the wireless communication device comprises a telephone handset and wherein the receiver is configured to demodulate, according to a wireless communication standard, a signal comprising the encoded video data.

53. The device of claim 32, wherein the device comprises a wireless communication device, further comprising a receiver configured to receive encoded video data.

54. The device of claim 53, wherein the wireless communication device comprises a telephone handset and wherein the receiver is configured to demodulate, according to a wireless communication standard, a signal comprising the encoded video data.

* * * * *